US008344070B2

(12) United States Patent
Squire et al.

(10) Patent No.: US 8,344,070 B2
(45) Date of Patent: Jan. 1, 2013

(54) POLYMER COMPOSITIONS COMPRISING CYCLIC OLEFIN POLYMERS, POLYOLEFIN MODIFIERS, AND FILLERS

(75) Inventors: Kevin R. Squire, Kingwood, TX (US); Alan J. Oshinski, Friendswood, TX (US); Kevin D. Robinson, Houston, TX (US); Christian Peter Mehnert, Houston, TX (US); Marsha M. Arvedson, Houston, TX (US); Beverly J. Poole, Houston, TX (US); Abhimanyu Onkar Patil, Westfield, NJ (US); Lisa Saunders Baugh, Ringoes, NJ (US); Karla Schall Colle, Houston, TX (US)

(73) Assignee: ExxonMobil Chemical Patents Inc., Houston, TX (US)

(*) Notice: Subject to any disclaimer, the term of this patent is extended or adjusted under 35 U.S.C. 154(b) by 412 days.

(21) Appl. No.: 11/820,559

(22) Filed: Jun. 20, 2007

(65) Prior Publication Data
US 2009/0318597 A1 Dec. 24, 2009

Related U.S. Application Data

(60) Provisional application No. 60/835,512, filed on Aug. 4, 2006, provisional application No. 60/836,009, filed on Aug. 7, 2006.

(51) Int. Cl.
*C08L 45/00* (2006.01)
*C08L 23/00* (2006.01)
*C08L 23/04* (2006.01)
*C08F 8/00* (2006.01)

(52) U.S. Cl. ........ 525/211; 525/210; 525/191; 525/240; 525/232; 524/490; 524/789; 524/449; 524/451; 524/445; 524/791

(58) Field of Classification Search .................. 525/210, 525/232, 211, 191, 240; 524/789, 449, 451, 524/445, 456, 791, 490
See application file for complete search history.

(56) References Cited

U.S. PATENT DOCUMENTS

| | | | |
|---|---|---|---|
| 2,799,668 A | 7/1957 | Anderson et al. | |
| 2,883,372 A | 4/1959 | Stamatoff | |
| 3,494,897 A | 2/1970 | Reding et al. | |
| 3,932,308 A | 1/1976 | Loveless et al. | |
| 4,460,724 A | 7/1984 | Tsuchiya et al. | |
| 4,614,778 A | 9/1986 | Kajiura et al. | |
| 4,874,808 A | 10/1989 | Minami et al. | |
| 4,918,133 A | 4/1990 | Moriya et al. | |
| 4,992,511 A * | 2/1991 | Yamamoto et al. | 525/97 |
| 5,087,677 A | 2/1992 | Brekner et al. | |
| 5,218,049 A * | 6/1993 | Yamamoto et al. | 525/97 |
| 5,359,001 A | 10/1994 | Epple et al. | |
| 5,428,098 A | 6/1995 | Brekner et al. | |
| 5,573,717 A | 11/1996 | Peiffer et al. | |
| 5,574,100 A | 11/1996 | Sagane et al. | |
| 5,753,755 A | 5/1998 | Shachi et al. | |
| 5,854,349 A | 12/1998 | Abe et al. | |
| 5,863,986 A | 1/1999 | Herrmann-Schonherr et al. | |
| 6,090,888 A | 7/2000 | Khanarian et al. | |
| 6,191,243 B1 | 2/2001 | Nitta et al. | |
| 6,225,407 B1 | 5/2001 | Jacobs et al. | |
| 6,255,396 B1 | 7/2001 | Ding et al. | |
| 6,331,593 B1 | 12/2001 | Johoji et al. | |
| 6,342,549 B1 | 1/2002 | Hirose et al. | |
| 6,346,581 B1 | 2/2002 | Tsungae et al. | |
| 6,590,033 B2 | 7/2003 | Ding et al. | |
| 6,596,810 B1 | 7/2003 | Hatke et al. | |
| 6,649,707 B1 | 11/2003 | Rhodes et al. | |
| 6,653,388 B1 | 11/2003 | Barbee et al. | |
| 6,696,524 B2 | 2/2004 | Hausmann | |
| 6,767,966 B2 | 7/2004 | Berger et al. | |
| 6,844,059 B2 | 1/2005 | Bernd et al. | |
| 7,015,276 B2 | 3/2006 | Morita et al. | |
| 2001/0009950 A1 | 7/2001 | Hashidzume et al. | |
| 2003/0096898 A1 | 5/2003 | Bernd et al. | |
| 2003/0125464 A1 | 7/2003 | Yabui | |
| 2003/0236352 A1 * | 12/2003 | Winowiecki | 525/191 |
| 2004/0236024 A1 | 11/2004 | Rivett et al. | |
| 2005/0014898 A1 | 1/2005 | Kanai | |
| 2006/0276571 A1 | 12/2006 | Sharma et al. | |
| 2007/0093585 A1 | 4/2007 | Syed et al. | |
| 2008/0249235 A1 * | 10/2008 | Kaneko et al. | 524/553 |

FOREIGN PATENT DOCUMENTS

DE 2731445 2/1978
(Continued)

OTHER PUBLICATIONS

F. Stricker et al., Rubber-toughened cycloolefin copolymers, *Die Angewandte Makromolekulare Chemie*, vol. 256, No. 4503, pp. 101-104, 1998.
G. Khanarian, Rubber Toughened and Optically Transparent Blends of Cyclic Olefin Copolymers, *Polymer Engineering and Science*, vol. 40, No. 12, pp. 2590-2601, Dec. 2000.
Vistalon 7500 flyer, 2003.
Vistalon 8600 flyer, 2001.
Vistalon 8800 flyer, 1997.

*Primary Examiner* — James J Seidleck
*Assistant Examiner* — Deve E Valdez
(74) *Attorney, Agent, or Firm* — Darryl M Tyus

(57) ABSTRACT

A polymer composition comprises (a) least 40 wt % (based upon the weight of the composition) of a cyclic olefin polymer comprising at least one acyclic olefin and at least 20 wt % of one or more cyclic olefins (based upon the weight of the cyclic olefin polymer), wherein at least a portion of the cyclic olefin polymer has a glass transition temperature of greater than 100° C.; (b) an acyclic olefin polymer modifier in an amount up to 40 wt % (based upon the weight of the composition); and (c) at least 10 wt % (based upon the weight of the composition) of one of more fillers. The polymer composition has a notched Izod impact resistance measured at 23° C. of greater than 100 J/m and a flexural modulus (1% secant method) of greater than 1400 MPa.

51 Claims, 5 Drawing Sheets

FOREIGN PATENT DOCUMENTS

| | | |
|---|---|---|
| DE | 150751 | 9/1981 |
| DE | 203059 | 10/1983 |
| DE | 203061 | 10/1983 |
| DE | 203062 | 10/1983 |
| DE | 205916 | 1/1984 |
| DE | 206783 | 2/1984 |
| DE | 209840 | 5/1984 |
| DE | 214849 | 10/1984 |
| DE | 214850 | 10/1984 |
| DE | 214851 | 10/1984 |
| EP | 0 566 988 | 10/1993 |
| EP | 0 597 119 | 5/1994 |
| EP | 0 608 903 | 8/1994 |
| EP | 0 647 676 | 4/1995 |
| EP | 785 969 | 10/1995 |
| EP | 0 726 291 | 8/1996 |
| EP | 743 341 | 11/1996 |
| EP | 0 964 005 | 12/1999 |
| EP | 1 245 591 | 11/2006 |
| JP | 48-074590 | 10/1973 |
| JP | 01-318054 | 12/1989 |
| JP | 03-079611 | 4/1991 |
| JP | 03-255145 | 11/1991 |
| JP | 04-170453 | 6/1992 |
| JP | 04-170454 | 6/1992 |
| JP | 05-009351 | 1/1993 |
| JP | 5279489 | 10/1993 |
| JP | 05-320267 | 12/1993 |
| JP | 05-320268 | 12/1993 |
| JP | 07-247386 | 9/1995 |
| JP | 07-292181 | 11/1995 |
| JP | 10-095881 | 4/1998 |
| JP | 63243103 | 10/1998 |
| JP | 2000-302811 | 10/2000 |
| JP | 2001031716 | 2/2001 |
| JP | 2004-156048 | 6/2004 |
| JP | 2004231921 | 8/2004 |
| JP | 2005010813 | 1/2005 |
| WO | WO 98/44043 | 10/1998 |

\* cited by examiner

POLYMER COMPOSITIONS COMPRISING CYCLIC OLEFIN POLYMERS, POLYOLEFIN MODIFIERS, AND FILLERS

CROSS REFERENCE TO RELATED APPLICATIONS

This application claims priority to U.S. Provisional Patent Application No. 60/835,512, filed Aug. 4, 2006 and U.S. Provisional Patent Application No. 60/836,009, filed Aug. 7, 2006, the disclosures of which are incorporated by reference.

FIELD OF THE INVENTION

The present invention relates to polymer compositions comprising cyclic olefin polymers, polyolefin modifiers, and fillers.

BACKGROUND OF THE INVENTION

Cyclic olefin polymers have high glass transition temperatures and high stiffness, however, they suffer from very poor impact properties and are too brittle for many applications. Numerous attempts have been made to improve their impact properties by blending with modifiers of many types, and their stiffness by blending with reinforcements. None of these previous attempts has been very successful, and for the most part, cyclic olefin polymers have been relegated to applications taking advantage of only their optical clarity, moisture resistance, and good birefringence properties.

Polyolefins, and in particular those of the polyethylene and polypropylene groups, are low-cost, lower-density thermoplastics which melt readily and are resistant to chemicals. These materials therefore have many uses in areas such as general household items and electrical and electronic parts. However, polyolefins usually have poor mechanical properties and relatively low heat distortion temperatures (HDT). For example, a typical polypropylene homopolymer has a flexural modulus of about 1.9 GPa, a heat distortion temperature at 0.46 MPa of about 126° C., and a notched Izod impact resistance of about 48 J/m. These plastics are therefore unsuitable for use in areas which require high heat resistance, high mechanical strength, and/or high impact resistance.

To improve their impact resistance, polypropylene homopolymers are often blended with ethylene-propylene rubber (EPR) or ethylene-propylene-diene (EPDM) rubber. EPR and EPDM rubbers are ideal for impact modification, because they remain ductile until their glass transition temperatures at about −45° C. and effectively toughen polypropylene even at −29° C., a common testing temperature. EPR, EPDM, and polypropylene have similar polarities, so small rubber domains can be well dispersed in the polypropylene. Impact resistance can also be improved by polymerizing the propylene with a few percent of ethylene to make impact polymers. However, these improved impact properties come with decreased modulus and lowered heat distortion temperatures. Thus, a typical polypropylene impact polymer containing EPR has flexural modulus of about 1.0 GPa, a heat distortion temperature at 0.46 MPa of about 92° C., a room temperature notched Izod impact strength so high that no test samples break (approx. 500 J/m or more), and generally has only ductile failures in the instrumented impact test at −29° C. (approx. 43 J of energy adsorbed).

To achieve more balanced properties, polypropylenes can be blended with both ethylene-propylene or ethylene-propylene-diene elastomers and inorganic fillers such as talc, mica, or glass fibers. Talc and mica reinforcements are generally preferred to glass fibers, because the compounded polymers have better surface and flow properties. An example of these materials is ExxonMobil's AS65 KW-1ATM, which has a flexural modulus of about 2.4 GPa, a heat distortion temperature at 0.46 MPa of about 124° C. and a notched Izod Impact of about 400 J/m. These polymer blends have a good balance of properties and are used in automotive interior applications. However, these blends can not be used for some automotive structural applications, where useful materials need heat distortion temperatures at 0.46 MPa of at least 140° C. and at 1.80 MPa of at least 120° C., together with a modulus of at least 2.5 GPa and a room temperature notched Izod impact of at least 100 J/m.

In an attempt to achieve balanced properties that exceed those of blended polypropylenes, blends of cyclic olefin polymers with polyolefins have also been proposed. For example, polymers of ethylene with norbornene and with 2,3-dihydrodicyclopentadiene are disclosed in U.S. Pat. No. 2,799,668 (Jul. 16, 1957) and U.S. Pat. No. 2,883,372 (Apr. 21, 1959). However, these polymers use $TiCl_4$ as the catalyst and are polymerized by ring opening metathesis—the cyclic olefin rings opened during polymerization with ethylene, leaving a residual double bond in the backbone of the polymer. Because the rings open, the chains are less rigid than addition polymerization cyclic olefin polymers. The residual unsaturation in their backbones also make these polymers oxidatively unstable at high temperatures. Consequently, although these polymers have desirable rigidity and transparency, they are poor in heat resistance.

U.S. Pat. No. 3,494,897 discloses a high pressure, peroxide initiated, radical polymerization to make ethylene/cyclic olefin polymers but these polymerizations can only incorporate small amounts of the cyclic olefins. As a result, the polymers do not have high glass transition temperatures.

Several blends of ethylene/norbornene polymers with polyolefins were described by researchers at VEB Leuna-Werke in the early 1980s (DE 2731445 C3, DD 150751, DD 203061, DD 203059, DD 203062, DD 205916, DD 206783, DD 209840, DD 214851, DD 214849, and DD 214850). However, these blends were made before the discovery of either the Ziegler-Natta vanadium/aluminum or metallocene addition polymerization catalysts. The ethylene/norbornene polymers used in these blends were made with catalysts that open cyclic rings during polymerization and lead to residual unsaturation in the polymer backbones. The Vicat softening temperatures exemplified in these patents range from 114 to 133° C. indicating that these polymers do not have the heat stability required for automotive structural applications. In this respect, it is to be appreciated that Vicat softening temperatures are generally about 10° C. higher than the glass transition temperature of a glassy polymer, whereas the glass transition temperature of a glassy polymer is generally about 10° C. higher than its heat distortion temperature at 0.46 MPa. Thus Vicat softening temperatures from 114 to 133° C. are roughly equivalent to heat distortion temperatures of about 94 to 113° C. using the 0.46 MPa load.

U.S. Pat. No. 4,614,778 discloses a random polymer of ethylene with a 1,4,5,8-dimethano-1,2,3,4,4a,5,8,8a-octahydronaphthalene and optionally an alpha-olefin having at least three carbon atoms or a cycloolefin, such as norbornene. The mole ratio of polymerized units from the 1,4,5,8-dimethano-1,2,3,4,4a,5,8,8a-octahydronaphthalene to polymerized units from ethylene is from 3:97 to 95:5 and the 1,4,5,8-dimethano-1,2,3,4,4a,5,8,8a-octahydronaphthalene is incorporated in the ethylene polymer chain using a Ziegler-Natty vanadium/aluminum catalyst. The cyclic olefin rings do not open during polymerization, and the resultant polymers contain no residual unsaturation in their backbone. Thus, these polymers have high heat distortion temperatures and glass transition temperatures as high as 171° C. However, the polymers are quite brittle, when pressed into films, and all are polymers of ethylene and cyclic olefin comonomers containing at least four fused rings. The disadvantage of these larger comonomers is that extra Diels-Alder addition reactions are required to build them up from ethylene and cyclopentadiene, making them more expensive to synthesize than norbornene or dicyclopentadiene. No blends are exemplified in this patent.

U.S. Pat. No. 5,087,677 describes the polymerization of ethylene and cyclic olefins, particularly norbornene, using zirconium and hafnium metallocene catalysts. Like the vanadium/aluminum polymerized polymers described in U.S. Pat. No. 4,614,778, the metallocene polymerized polymers do not have residual unsaturation in their backbones and the cyclic olefins do not ring open. Consequently, these metallocene ethylene/cyclic olefin polymers have high heat stabilities and glass transition temperatures, with values as high as 163° C. for the glass transition temperature being exemplified. There is brief mention, but no exemplification, of alloying the polymers with other polymers, such as polyethylene, polypropylene, (ethylene/propylene)polymers, polybutylene, poly-(4-methyl-1-pentene), polyisoprene, polyisobutylene, and natural rubber.

U.S. Pat. No. 4,918,133 discloses a cycloolefin type random polymer composition, which is alleged to exhibit excellent heat resistance, chemical resistance, rigidity, and impact resistance, and which comprises (A) a random polymer containing an ethylene component and a cycloolefin component and having an intrinsic viscosity [η] of 0.05-10 dl/g as measured at 135° C. in decalin and a softening temperature (TMA) of not lower than 70° C., and (B) one or more non-rigid polymers selected from the group consisting of: (i) a random polymer containing an ethylene component, at least one other α-olefin component and a cycloolefin component and having an intrinsic viscosity [η] of 0.01-10 dl/g as measured at 135° C. in decalin and a softening temperature (TMA) of below 70° C., (ii) a non-crystalline to low crystalline α-olefin type elastomeric polymer formed from at least two α-olefins, (iii) an α-olefin-diene type elastomeric polymer formed from at least two α-olefins and at least one non-conjugated diene, and (iv) an aromatic vinyl type hydrocarbon-conjugated diene polymer or a hydrogenated product thereof, and optionally (c) an inorganic filler or organic filler. The cycloolefin component of the polymer (A) can be a large number of 1 to 4-ring bridged cyclic olefins and, although these include norbornene, the only material exemplified is 1,4,5,8-dimethano-1,2,3,4,4a,5,8,8a-octahydronaphthalene (DMON) and a methyl-substituted version thereof.

U.S. Pat. No. 6,255,396 discloses a polymer blend useful for fabrication into transparent articles for medical applications and comprising 1-99% by weight of a first component obtained by polymerizing a norbornene monomer and an ethylene monomer, and 99% to 1% by weight of a second component comprising an ethylene polymer with an α-olefin having 6 carbon atoms. The first component has a glass transition temperature of from 50° C. to 180° C., but the second blend component has a softening points above 30° C. due to either its melting point (softening temperatures are slightly below the melting point) or its glass transition temperatures (softening point is typically about 10° C. above $T_g$). No measurements of flexural modulus or impact strengths are reported in the patent and no inorganic fillers are exemplified.

U.S. Pat. No. 6,590,033 discloses a polymer blend similar to that described in U.S. Pat. No. 6,255,396 but with the second component comprising a homopolymer or polymer of a diene having from 4 to 12 carbons. Such diene polymers typically have softening points above 30° C. or solubility parameters that are too different from those of the cyclic olefin polymers to be compatible. For example, the Bicerano solubility parameter for poly(1,4-butadiene) is 17.7 $J^{0.5}/cm^{1.5}$ compared with 16.88 $J^{0.5}/cm^{1.5}$ for the cyclic olefin polymers. (Values are from Table 5.2 in *Prediction of Polymer Properties*, $3^{rd}$ *edition* by Jozef Bicerano published by Marcel Dekker in 2002.) In addition, poly(1,4-butadiene) is too polar to be effective at toughening cyclic olefin polymers.

U.S. Pat. No. 6,844,059 discloses long-fiber-reinforced polyolefin structure of length≧3 mm, which comprises a) from 0.1 to 90% by weight of at least one polyolefin other than b), b) from 0.1 to 50% by weight of at least one amorphous cycloolefin polymer, such as an ethylene/norbornenes polymer, c) from 5.0 to 75% by weight of at least one reinforcing fiber, and d) up to 10.0% by weight of other additives. The polyolefin a) may be obtained by addition polymerization of ethylene or of an α-olefin, such as propylene, using a suitable catalyst and generally is a semi-crystalline homopolymer of an α-olefin and/or ethylene, or a polymer of these with one another.

In *Die Angewandte Makromolekulare Chemie* 256 (1998), pp. 101-104, Stricker and Mulhaupt describe blends of an ethylene/norbornene polymer containing only 40 wt. % norbornene. The thermal stability of this polymer is not reported, however the glass transition temperature can be estimated at less than 60° C. The rubber used to toughen the cyclic olefin polymer is a polystyrene-b-poly(ethylene-co-butylene)-b-polystyrene (SEBS) polymer. Polystyrene blocks in this polymer have glass transition temperatures in the range 83-100° C., giving this modifier a softening temperature of more than 80° C.

In an article entitled "Rubber Toughened and Optically Transparent Blends of Cyclic Olefin Polymers" in *Polymer Engineering and Science*, Vol. 40(12), p. 2590-2601, December, 2000, Khanarian describes unfilled blends of the ethylene/norbornene polymer TOPAS 6013 with thermoplastic elastomers such as styrene-butadiene-styrene (SBS), styrene-ethylene-butadiene-styrene (SEBS), and styrene-ethylene-propylene-styrene (SEPS). The TOPAS 6013 has a glass transition temperature of 140° C. and it is reported that blending with less than 5 wt % of the elastomer allows the impact strength to be increased to greater than 50 J/m (Notched Izod) while keeping the optical haze below 5%. Using high loadings of the styrenic block polymers, Khanarian achieves a notched Izod impact strength as high as 520 J/m with 30 wt. % polystyrene-b-polybutadiene-b-polystyrene. This modifier has a softening point above 30° C. due to the glass transition temperature of the polystyrene blocks. Khanarian also exemplifies some blends with ethylene-propylene-diene terpolymers, but the impact strength reported is only 188 J/m with a 20 wt. % loading. Measured heat distortion temperatures are not presented in this paper but, given the low glass transition temperature of the TOPAS 6013, are probably less than 125° C. at 0.46 MPa.

Other references of interest include U.S. Pat. Nos. 4,874,808; 4,992,511; 5,428,098; 5,359,001; 5,574,100; 5,753,755; 5,854,349; 5,863,986; 6,090,888; 6,225,407; US 2003/0125464 A1; U.S. Pat. Nos. 6,596,810 B1; 6,696,524 B2; 6,767,966 B2; US 2004/0236024 A1; and US 2005/0014898 A1.

According to the invention, it has now been found that blending high glass transition temperature cyclic olefin polymers with compatible, low glass transition temperature polyolefin elastomers, and fillers can produce polymer blends having a desirable combination of high stiffness, impact toughness, and thermal stability making certain of the blends suitable for use in automotive structural applications.

SUMMARY OF THE INVENTION

In one aspect, the invention resides in a polymer composition comprising:
(a) at least 40 wt % (based upon the weight of the composition) of a cyclic olefin polymer, said cyclic olefin polymer comprising at least one acyclic olefin and at least 20 wt % (based upon the weight of the cyclic olefin polymer) of one or more cyclic olefins, wherein at least a portion of said cyclic olefin polymer has a glass transition temperature of greater than 100° C.;
(b) an acyclic olefin polymer modifier in an amount up to 40 wt % (based upon the weight of the composition); and
(c) at least 10 wt % (based upon the weight of the composition) of one of more fillers, wherein the notched Izod impact resistance of the composition measured at 23° C. is greater than 100 J/m and the flexural modulus (1% secant method) of the composition is greater than 1400 MPa.

Conveniently, said cyclic olefin polymer comprises at least 30 wt %, alternately at least 40 wt %, of one or more cyclic olefins.

Conveniently, at least a portion of said cyclic olefin polymer has a glass transition temperature of greater than 120° C., such as greater than 140° C., for example greater than 160° C. In one embodiment all of said cyclic olefin polymer has a glass transition temperature of greater than 100° C., preferably greater than 120° C., more preferably greater than 140° C., even more preferably greater than 160° C.

Conveniently, said composition comprises from about 15 wt % to about 40 wt %, such as from about 20 wt % to about 30 wt %, of the polyolefin modifier.

Conveniently, at least a portion, and more preferably all, of the polymer modifier has a glass transition temperature of less than −30° C., for example less than −40° C., such as less than −50° C. Conveniently, no portion of the polymer modifier has a softening point greater than +30° C., for example greater than +10° C.

In one embodiment, the Bicerano solubility parameter of the polymer modifier is up to 0.6 $J^{0.5}/cm^{1.5}$, such as between 0.1 and 0.5 $J^{0.5}/cm^{1.5}$, for example between 0.2 and 0.4 $J^{0.5}/cm^{1.5}$, less than the Bicerano solubility parameter of the cyclic olefin polymer.

Conveniently, said composition comprises from about 10 wt % to about 40 wt %, such as from about 15 to about 30 wt %, of the filler. Conveniently, the filler is an inorganic material and is selected from talc, mica, and glass fibers.

In one embodiment, the polymer composition has a notched Izod impact resistance measured at 23° C. of greater than 150 J/m, for example greater than 200 J/m, such as greater than 300 J/m, even greater than 500 J/m and a flexural modulus (1% secant method) greater than 2000 MPa, such as greater than 2500 MPa, for example greater than 3000 MPa.

In further embodiments, the polymer composition has a notched Izod impact resistance measured at −18° C. of greater than 50 J/m, such as greater than 100 J/m, for example greater than 150 J/m, even greater than 200 J/m; a heat distortion temperature measured using a 0.46 MPa load of greater than 85° C., for example greater than 100° C., such as greater than 115° C., even greater than 130° C.; and an instrumented impact energy measured at 23° C. of greater than 15 J, for example greater than 25 J.

DETAILED DESCRIPTION OF THE EMBODIMENTS

Figure 1:
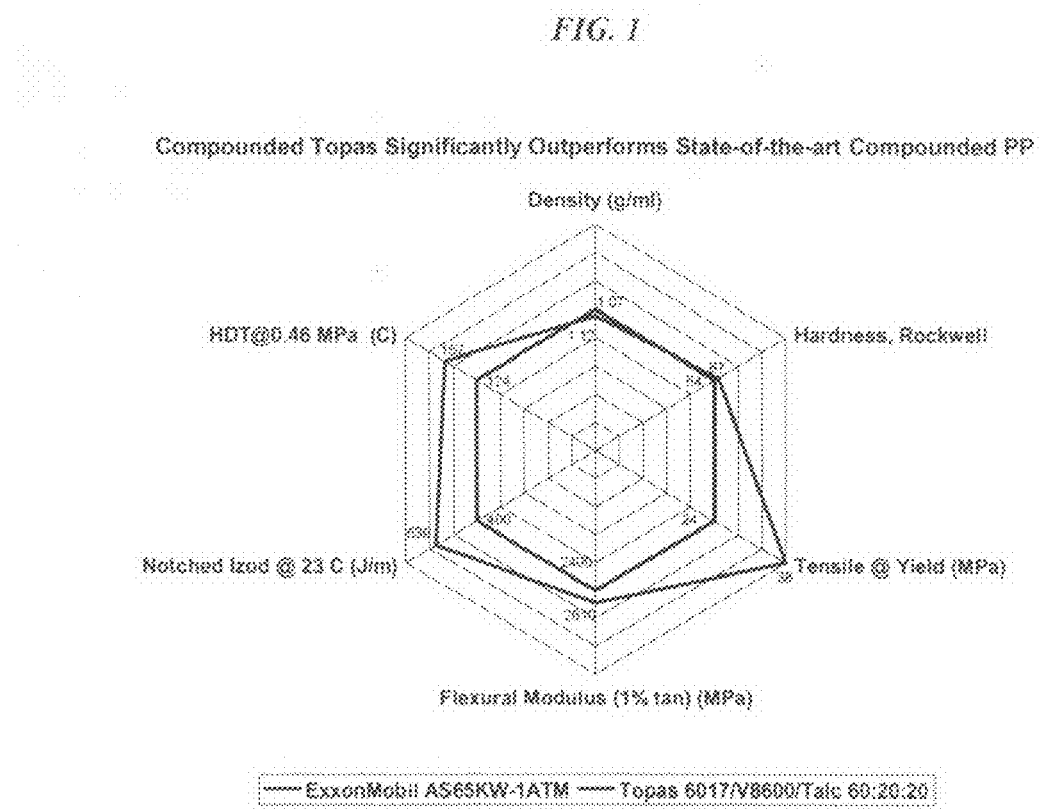
FIG. 1 is a graph comparing the properties of the 60:20:20 Topas 6017/Vistalon 8600/Talc blend of Example 1 with those of ExxonMobil AS65 KW, a polypropylene blended with talc and modifiers.

When a polymer or oligomer is referred to as comprising an olefin, the olefin present in the polymer or oligomer is the polymerized or oligomerized form of the olefin, respectively. The term polymer is meant to encompass homopolymers and copolymers. The term copolymer includes any polymer having two or more different monomers in the same chain, and encompasses random copolymers, statistical copolymers, interpolymers, and (true) block copolymers.

The present invention provides a polymer composition comprising:
(a) at least 40 wt %, such as about 50 wt % to about 75 wt %, (based upon the weight of the composition) of a cyclic olefin polymer, said cyclic olefin polymer comprising at least one acyclic olefin and at least 20 wt % (based upon the weight of the cyclic olefin polymer) of one or more cyclic olefins, wherein at least a portion of said cyclic olefin polymer having a glass transition temperature of greater than 100° C.; and
(b) 0 to 40 wt %, for example about 15 wt % to about 40 wt %, such as from about 20 wt % to about 30 wt %, (based upon the weight of the composition) of an acyclic olefin second polymer, and
(c) at least 10 wt %, such as from about 10 wt % to about 40 wt %, such as from about 15 wt % to about 30 wt %, (based upon the weight of the composition) of one of more fillers.

The composition has a notched Izod impact resistance measured at 23° C. of greater than 100 J/m and a flexural modulus (1% secant method) of greater than 1400 MPa. Such blends are often suitable for use in automotive structural applications.

Cyclic Olefin Polymer

The cyclic olefin first polymer component of the present polymer composition is produced by polymerizing at least one cyclic olefin with at least one acyclic olefin and possibly one or more dienes. The total of amount of all the cyclic olefins in the first polymer is from about 20 to about 99 weight % of the polymer. The residual double bonds in cyclic olefin polymers may not have reacted or may have been hydrogenated, crosslinked, or functionalized. Cyclic olefin polymers may have been grafted using free radical addition reactions or in-reactor polymerizations. They may be block polymers made using chain shuttling agents.

Cyclic olefins are defined herein as olefins where at least one double bond is contained in one or more alicyclic rings. Cyclic olefins may also have acyclic double bonds in side chains. Suitable cyclic olefins for use in cyclic olefin polymer component include norbornene, tricyclodecene, dicyclopentadiene, tetracyclododecene, hexacycloheptadecene, tricycloundecene, pentacyclohexadecene, ethylidene norbornene (ENB), vinyl norbornene (VNB), norbornadiene, alkylnorbornenes, cyclopentene, cyclopropene, cyclobutene, cyclohexene, cyclopentadiene (CP), cyclohexadiene, cyclooctatriene, indene, any Diels-Alder adduct of cyclopentadiene and an acyclic olefin, cyclic olefin, or diene; and any Diels-Alder adduct of butadiene and an acyclic olefin, cyclic olefin, or diene; vinylcyclohexene (VCH); alkyl derivatives of cyclic olefins; and aromatic derivatives of cyclic olefins.

Suitable acyclic olefins for use in cyclic olefin polymer component include alpha olefins (1-alkenes), isobutene, 2-butene, and vinylaromatics. Examples of such acyclic olefins are ethylene, propylene, 1-butene, isobutene, 2-butene, 1-pentene, 1-hexene, 1-heptene, 1-octene, 1-nonene, 1-decene, styrene, p-methylstyrene, p-t-butylstyrene, p-phenylstryene, 3-methyl-1-pentene, vinylcyclohexane, 4-methyl-1-pentene, alkyl derivatives of acyclic olefins, and aromatic derivatives of acyclic olefins. Dienes are defined herein broadly as including any olefin containing at least two acyclic double bonds. They may also contain aromatic substituents. If one or more of the double bonds of diene is contained in an alicyclic ring, the monomer is classified as a cyclic olefin in this invention. Suitable dienes for use in the cyclic olefin polymer component are 1,4-hexadiene; 1,5-hexadiene; 1,5-heptadiene; 1,6-heptadiene; 1,6-octadiene; 1,7-octadiene; 1,9-decadiene; butadiene; 1,3-pentadiene; isoprene; 1,3-hexadiene; 1,4-pentadiene; p-divinylbenzene; alkyl derivatives of dienes; and aromatic derivatives of dienes.

Suitable cyclic olefin polymers for use as the first polymer component of the present composition include ethylene-norbornene polymers; ethylene-dicyclopentadiene polymers; ethylene-norbornene-dicyclopentadiene terpolymers; ethylene-norbornene-ethylidene norbornene terpolymers; ethylene-norbornene-vinylnorbornene terpolymers; ethylene-norbornene-1,7-octadiene terpolymers; ethylene-cyclopentene polymers; ethylene-indene polymers; ethylene-tetracyclododecene polymers; ethylene-norbornene-vinylcyclohexene terpolymers; ethylene-norbornene-7-methyl-1,6-octadiene terpolymers; propylene-norbornene polymers; propylene-dicyclopentadiene polymers; ethylene-norbornene-styrene terpolymers; ethylene-norbornene-p-methylstyrene terpolymers; functionalized ethylene-dicyclopentadiene polymers; functionalized propylene-dicyclopentadiene polymers; functionalized ethylene-norbornene-diene polymers; maleic anhydride grafted cyclic olefin polymers; silane grafted cyclic olefin polymers; hydrogenated ethylene-dicyclopentadiene polymers; epoxidized ethylene-dicyclopentadiene polymers; epoxidized ethylene-norbornene-dicyclopentadiene terpolymers; grafted cyclic olefin polymers; short chain branched cyclic olefin polymers; long chain branched cyclic olefin polymers; and crosslinked cyclic olefin polymers.

Cyclic olefin polymers containing norbornene or hydrogenated dicyclopentadiene are particularly preferred. Norbornene is made from the Diels-Alder addition of cyclopentadiene and ethylene. (Cyclopentadiene is made commercially by a reverse Diels-Alder reaction starting with dicyclopentadiene). Dicyclopentadiene is a byproduct of cracking heavy feedstocks to make ethylene and propylene. Other preferred cyclic olefins are Diels-Alder adducts of cyclopentadiene with other olefins, leading to alkyl- or arylnorbornenes, or with butadiene leading to vinylnorbornene and ethylidene norbornene. The Diels-Alder adduct of butadiene with itself leads to vinylcyclohexene, which is another preferred monomer. A preferred acyclic olefin for cyclic olefin polymers is ethylene since ethylene-cyclic olefin polymers have slightly better impact properties than other polymers. Terpolymers of ethylene with norbornene and dienes containing a double bond in alicyclic rings are also preferred, because they can easily be crosslinked, grafted, or functionalized.

At least a portion, and preferably all, of the cyclic olefin polymer employed in the first polymer component of the present composition has a glass transition temperature greater than 100° C., conveniently greater than 120° C., such as greater than 140° C., for example greater than 160° C. These high glass transition temperature domains will start softening about 10-30° C. below the glass transition temperature and lead to heat distortion temperatures using a 0.45 MPa load of about 10-15° C. below their glass transition temperature and to heat distortion temperatures using a 1.80 MPa load of about 30-35° C. below the glass transition temperature. If only a portion of the cyclic olefin polymers has a glass transition temperature greater than 100° C., it is preferable that the remaining portion has a softening point below 30° C., such as below 10° C. Such a cyclic olefin polymer might be a block or graft polymer with an elastomer. If a portion of the cyclic olefin polymer has a softening point above 30° C. and below the softening point associated with the glass transition temperature above 100° C., it will tend to lower the heat distortion temperature and high temperature modulus of the composition. Cyclic olefin polymers where all the domains have glass transition temperatures greater than 100° C. are preferred.

For automotive applications, where the present composition is to be injection molded, it is also preferred for the cyclic olefin polymers to have high melt flow rates when measured at the processing temperatures of the injection molding machine. Melt flow rates greater than 5 ml/10 min. in the ISO 1133 test at 115° C. above the heat distortion temperature using the 1.80 MPa load are preferred.

Useful ethylene-norbornene polymers are can be purchased from Topas Advanced Polymers and Mitsui Chemicals. Ethylene/norbornene polymers made with metallocene catalysts are available commercially from Topas Advanced Polymers GmbH, as TOPAS polymers. TOPAS grades 6015 and 6017 are reported to have glass transition temperatures of 160 and 180° C., respectively. Their reported heat distortion temperatures at 0.46 MPa (150 and 170° C., respectively) and at 1.80 MPa (135 and 151° C., respectively) can provide polymer compositions meeting the preferred heat distortion temperature of at least 130° C. at 0.46 MPa.

Useful cyclic-olefin polymers can be made using vanadium, Ziegler-Natta, and metallocene catalysts. Examples of suitable catalysts are disclosed in U.S. Pat. Nos. 4,614,778 and 5,087,677.

Acyclic Olefin Second Polymer

The second polymer component of the present composition comprises one or more random, blocky, or block polymers. Each of the polymers is polymerized from at least one olefin and, possibly, at least one diene. The olefins can be either acyclic or cyclic olefins, as long as the total amount of cyclic olefin in the polymer is less than 20 weight %. The residual double bonds in the polyolefin modifiers may not have been reacted or may have been hydrogenated, functionalized, or crosslinked. The polyolefin modifiers may have been grafted using free radical addition reactions or in-reactor polymerizations. They may be block polymers made using chain shuttling agents.

Acyclic olefins suitable for use in the second polymer component include alpha olefins (1-alkenes), isobutene, 2-butene, and vinylaromatics. Examples of such acyclic olefins are ethylene, propylene, 1-butene, isobutene, 2-butene, 1-pentene, 1-hexene, 1-heptene, 1-octene, 1-nonene, 1-decene, styrene, p-methylstyrene, p-t-butylstyrene, p-phenylstryene, 3-methyl-1-pentene, vinylcyclohexane, 4-methyl-1-pentene, alkyl derivatives of acyclic olefins, and aromatic derivatives of acyclic olefins.

Cyclic olefins suitable for use in the second polymer component include norbornene, tricyclodecene, dicyclopentadiene, tetracyclododecene, hexacycloheptadecene, tricycloundecene, pentacyclohexadecene, ethylidene norbornene (ENB), vinyl norbornene (VNB), norbornadiene, alkylnorbornenes, cyclopentene, cyclopropene, cyclobutene, cyclohexene, cyclopentadiene (CP), cyclohexadiene, cyclooctatriene, indene, any Diels-Alder adduct of cyclopentadiene and an acyclic olefin, cyclic olefin, or diene; and Diels-Alder adduct of butadiene and an acyclic olefin, cyclic olefin, or diene; vinylcyclohexene (VCH); alkyl derivatives of cyclic olefins; and aromatic derivatives of cyclic olefins.

Dienes suitable for use in the second polymer component include 1,4-hexadiene; 1,5-hexadiene; 1,5-heptadiene; 1,6-heptadiene; 1,6-octadiene; 1,7-octadiene; 1,9-decadiene; butadiene; 1,3-pentadiene; isoprene; 1,3-hexadiene; 1,4-pentadiene; p-divinylbenzene; alkyl derivatives of dienes; and aromatic derivatives of dienes.

Suitable acyclic olefin polymers for use as the second polymer component of the present composition include high density polyethylene (HDPE); low density polyethylene (LDPE); linear low density polyethylene (LLDPE); isotactic polypropylene (iPP); atactic polypropylene (aPP); syndiotactic polypropylene (sPP); poly(1-butene); poly(isobutylene); butyl rubber; poly(butadiene); poly(3-methyl-1-pentene); poly(4-methyl-1-pentene); poly(1-hexene); semi-crystalline ethylene-propylene polymers; amorphous ethylene-propylene polymers; semi-crystalline propylene-ethylene polymers; semi-crystalline polymers of ethylene with alpha olefins; semi-crystalline polymers of ethylene with isobutylene or 2-butene; semi-crystalline polymers of ethylene with vinylaromatics; semi-crystalline polymers of ethylene with dienes such as hexadiene, vinylcyclohexene, and 7-methyl-1,6-octadiene; semi-crystalline polymers of propylene with alpha olefins; semi-crystalline polymers of propylene with vinyl aromatics; semi-crystalline polymers of propylene with vinyl aromatics; semi-crystalline polymers of propylene with isobutene or 2-butene; semi-crystalline polymers of propylene with dienes; in reactor blends of isotactic polypropylene with ethylene-propylene rubber or ethylene-propylene-diene terpolymers (ICPs); amorphous ethylene polymers with alpha olefins, vinyl aromatics, cyclic olefins, isobutene, 2-butene, or dienes; terpolymers of ethylene, alpha olefins including propylene, and dienes; terpolymers of ethylene, alpha olefins, and vinyl aromatics; terpolymers of ethylene, alpha olefins, and cyclic olefins; polyolefins grafted to polystyrene; polyolefins grafted to cyclic olefin polymers; polyolefins grafted to other polyolefins; terpolymers of propylene, another olefin, and dienes; amorphous polymers of isobutene with isoprene; amorphous polymers of isobutene and p-methylstyrene; polyolefins with double bonds that have been hydrogenated; polyolefins with double bonds that have been epoxidized or hydroxylated; polyolefins with double bonds that have been functionalized by electrophilic additions; any functionalized polyolefin; polyolefins with short and long chain branches, polyolefins which have been crosslinked through their double bonds; polyolefins which have been crosslinked through functional groups; and polyolefins that have been grafted using free radical addition reactions. Preferred second polymers include ethylene propylene rubbers (EP rubbers). The term "EP rubber" means a polymer of ethylene and propylene, and optionally one or more diene monomer(s) (as described above), where the ethylene content is from 25 to 80 wt %, the total diene content is up to 15 wt %, and the balance is propylene.

Conveniently, at least a portion of the second polymer component should have a glass transition temperature below $-30°$ C. These low glass transition temperature domains of the modifier remain ductile down to their glass transition temperatures and improve the low temperature notched Izod impact resistance and low temperature instrumented impact energy to the present composition. Preferably, the glass transition temperature of at least a portion of the polyolefin modifier is less than $-40°$ C., more preferably less than $-50°$ C. Preferably, all portions of the polyolefin modifier have these low glass transition temperatures and are available to toughen the brittle cyclic olefin polymer phases.

In addition, the second polymer component conveniently contains no portion with a softening point above 30° C., and preferably, above 10° C. A softening point above 30° C. is due to a glass transition temperature above 30° C. or a melting temperature of a significant portion of the modifier above 30° C. They are detectable as transitions or peaks in a differential scanning calorimeter (DSC), a Vicat softening point, a softening point in a thermal mechanical analyzer (TMA), or a sudden loss of modulus of the polyolefin modifier in a differential mechanical thermal analysis (DMTA) experiment. They are undesirable because the softening modifier also leads to a detectable softening and a lowered high temperature modulus for the composition.

The cyclic olefin first polymer used in present composition typically has a very high glass transition temperature and must, therefore, be processed at even higher temperatures. The second polymer modifier used in the composition must be stable at these high processing temperatures. It is therefore preferred that the modifier contains one or more anti-oxidants effective at stabilizing the modifier at these high processing temperatures. It is also preferred that the modifier contains a UV stabilizer to prevent damage during end use applications. Most preferred are polyolefin modifiers that contain no groups that are reactive at the processing temperatures used to blend and form the present compositions.

In order for the second polymer modifier to effectively toughen the brittle cyclic first polymer, it is desirable that the domain size of the second polymer is less than 1-2 μm, more preferably less than 1.0 μm, in average diameter. These small domains can be achieved, when the interfacial energy between the second polymer and the brittle cyclic olefin polymer is very small, or is even zero. Minimal interfacial energy between two phases means that breaking a large domain up into smaller domains with more interfacial area is thermodynamically allowed. Compositions with very small or zero interfacial energies can be effectively mixed, and the polyolefin modifiers dispersed, by applying shear to the melted mixture. In order to achieve toughening for a cyclic olefin polymer, the polyolefin modifier preferably has a zero or low interfacial energy with the first polymer. According to Souheng Wu in *Polymer Interface and Adhesion*, Marcel Dekker, 1982, zero or low interfacial energies are achieved when the polarity of the polyolefin modifier and cyclic olefin polymer are matched.

To match the polarities experimentally, surface energies or solubility parameters need to be measured for each polyolefin modifier and each cyclic olefin polymer. Surprisingly, it has been found that determining Bicerano solubility parameters can quickly narrow the candidate polyolefin modifiers for a given target cyclic olefin polymer. D. W. Van Krevelen in *Properties of Polymers, Their Correlation With Chemical Structure; Their Numerical Estimation and Prediction From Additive Group Contributions*, Elsevier, 1990 developed correlations between the functional groups present in a polymer chain and its experimental solubility parameter. These correlations worked fairly well but were limited to the set of polymers containing only the functional groups used in the original correlations. Jozef Bicerano extended these correlations in *Prediction of Polymer Properties, 3rd Edition*, Marcel Dekker, 2002, by replacing correlations with functional groups with correlations with graph theory indices. Graph theory indices depend only on how the polymer repeat units are bonded together and on the elements present in the repeat units. They can be calculated for any repeat unit and correlated well with solubility parameters. Bicerano has tabulated Bicerano solubility parameters for 121 common polymers in Table 5.2 of his book. These equations have also been programmed into the Synthia module of the Cerius$^2$ molecular modeling software package available from Accelrys. Using these Bicerano solubility parameters for both the cyclic olefin polymers and polyolefin modifiers used in the ensuing Examples, the compositions with the highest room temperature notched Izod impact resistance always occur when the Bicerano solubility parameter of the polyolefin modifiers are between 0.0 and 0.6 J$^{0.5}$/cm$^{1.5}$ less than the Bicerano solubility parameters of the cyclic olefin polymers. Preferably, the Bicerano solubility parameter of the polyolefin modifier is between 0.1-0.5 J$^{0.5}$/cm$^{1.5}$, more preferably between 0.2-0.4 J$^{0.5}$/cm$^{1.5}$, less than the Bicerano solubility parameter of the cyclic olefin polymer.

Preferred polyolefins useful as the second polymer in the compositions described herein can be purchased from ExxonMobil Chemical Company under the trade names Vistalon, Exxelor, Exact, or Vistamaxx, or they may be polymerized using vanadium, Ziegler-Natta, or metallocene catalysts by methods well known in the art.

Preferred EP rubbers useful as the second polymer in the compositions described herein include those having one or more of the following properties:
1) ethylene content of 25 to 80 wt % (preferably 30 to 75 wt %, preferably 35 to 70 wt %, preferably 40 to 65 wt %); and/or
2) diene content of 15 wt % or less (preferably 12 wt % or less, preferably 9 wt % or less, preferably 6 wt % or less, preferably 3 wt % or less, preferably 0 wt %); and/or
3) density of 0.87 g/cm$^3$ or less (preferably 0.865 g/cm$^3$ or less, preferably 0.86 g/cm$^3$ or less, preferably 0.855 g/cm$^3$ or less); and/or
4) heat of fusion (H$_f$), if detected, of less than 20 J/g (preferably less than 15 J/g, preferably less than 10 J/g, preferably less than 5 J/g, preferably a heat of fusion is indiscernible); and/or
5) ethylene or propylene crystallinity, if measurable, of less than 10 wt % (preferably less than 7.5 wt %, preferably less than 5 wt %, preferably less than 2.5 wt %, preferably crystallinity is undetected); and/or
6) melting point (T$_m$, peak first melt), if detected, of 60° C. or less (preferably 50° C. or less, preferably 40° C. or less, preferably 35° C. or less); and/or
7) glass transition temperature (T$_g$) of −30° C. or less (preferably 40° C. or less, preferably −50° C. or less, preferably −60° C. or less); and/or
8) M$_w$ of 50 to 3,000 kg/mol (preferably 100 to 2,000 kg/mol, preferably 200 to 1,000 kg/mol); and/or
9) M$_w$/M$_n$ of 1.5 to 40 (preferably 1.6 to 30, preferably 1.7 to 20, preferably 1.8 to 10, preferably 1.8 to 5, preferably 1.8 to 3, preferably 1.8 to 2.5); and/or
10) Mooney viscosity, ML(1+4) (125° C., of 10 to 100 (preferably 15 to 90, preferably 20 to 85).

Particularly preferred EP rubbers for use herein contain no diene (i.e., an ethylene-propylene polymers). If diene is present (i.e., an ethylene-propylene-diene terpolymer), preferably the diene is a norbornene-derived diene such as ethylidene norbornene (ENB), vinylidene norbornene (VNB), or dicyclopentadiene (DCPD). Diene content is measured by ASTM D 6047.

The method of making the EP rubber is not critical, as it can be made by slurry, solution, gas-phase, high-pressure, or other suitable processes, through the use of catalyst systems appropriate for the polymerization of polyolefins, such as Ziegler-Natta catalysts, metallocene catalysts, other appropriate catalyst systems or combinations thereof.

In a particularly preferred embodiment, the EP rubbers useful herein are produced using a vanadium-based catalyst system in a solution or slurry process. In another embodiment, the EP rubbers useful herein are produced using a metallocene-based catalyst system in a solution or slurry process. In yet another embodiment, the EP rubbers useful herein are produced using any single-sited catalyst system in a solution or slurry process. Preferably, the EP rubbers made by a vanadium, metallocene, or other single-sited catalyst system has a molecular weight distribution (M$_w$/M$_n$) of 1.8 to 2.5.

EP rubbers that are useful in this invention include those available from ExxonMobil Chemical (sold under the Vistalon™ tradename), including:

| ExxonMobil Chemical Vistalon ™ EP Rubbers | | | | |
|---|---|---|---|---|
| Grade | Mooney Viscosity (ML1 + 4, 125° C.) | Ethylene (wt %) | Diene (wt %) | Molecular Weight Distribution |
| 404 | 28 | 45 | — | very broad |
| 504 | 25 | 60 | — | broad |
| 606 | 65 | 54 | — | broad |
| 703 | 21 | 73 | — | narrow |
| 706 | 42 | 65 | — | bimodal |
| 707 | 23 | 72 | — | very broad |
| 722 | 16 | 72 | — | narrow |
| 785 | 30 | 49 | — | narrow |
| 805 | 33 | 78 | — | narrow |
| 878 | 51 | 60 | — | narrow |
| MDV 91-9 | 18 | 59 | — | narrow |
| 1703P | 25 | 77 | 0.9 VNB | very broad |
| 2727 | 44 | 57 | 2.0 ENB | broad |

-continued

ExxonMobil Chemical Vistalon ™ EP Rubbers

| Grade | Mooney Viscosity (ML1 + 4, 125° C.) | Ethylene (wt %) | Diene (wt %) | Molecular Weight Distribution |
|---|---|---|---|---|
| 3708 | 52 | 70 | 3.4 ENB | broad |
| 2504 | 25 | 58 | 4.7 ENB | broad |
| 2727 | 44 | 56 | 2.0 ENB | broad |
| 4600 | 90 | 60 | 4.5 ENB | bimodal |
| 4709 | 78 | 75 | 4.4 ENB | narrow |
| 5504 | 25 | 45 | 4.7 ENB | medium |
| 5601 | 72 | 68 | 5.0 ENB | tailored |
| 6505 | 53 | 57 | 9.2 ENB | broad |
| 7000 | 59 | 73 | 5.0 ENB | narrow |
| 7001 | 60 | 73 | 5.0 ENB | tailored |
| 7500 | 82 | 56 | 5.7 ENB | bimodal |
| 7800(P) | 20 | 79 | 6.0 ENB | bimodal |
| 8600 | 81 | 58 | 8.9 ENB | bimodal |
| 8609 | 83 | 68 | 8.0 ENB | bimodal |
| 8800 | 15 | 73 | 10.0 ENB | bimodal |
| 9500 | 72 | 60 | 11.0 ENB | bimodal |

Filler

In addition to the cyclic and acyclic olefin polymer components, the present composition contains one or more fillers or reinforcements. The filler or reinforcement is useful to, inter alia, increase the overall flexural and tensile moduli of the composition. This increase in moduli is believed to occur, because loads are carried by both the cyclic olefin polymers and the fillers. When the fillers are much stiffer than the cyclic olefin polymers, the combined load carrying ability of the compositions is increased. The higher the modulus of the fillers relative to that of the cyclic olefin polymers, the bigger the increase in the overall moduli of the composition. As the amount of fillers increases in the compositions, the moduli also increase. Fillers that have good interfacial adhesion to the cyclic olefin polymers are more effective than those where no adhesion is present, because loads are more efficiently transferred from the cyclic olefin polymers to the fillers. Since these compositions are also toughened with modifiers, preferred fillers will stay primarily in the cyclic olefin polymer phases with little presence in the modifier phases. The ability to stiffen the compositions increases, as the aspect ratio of the fillers increase. Very high aspect ratio fillers such as nanoclays, long or continuous glass fibers, and carbon nanotubes are highly efficient at stiffening these compositions. Very small fillers with high aspect ratios have high surface areas. They are highly efficient at sharing loads with the surrounding polymers. In particular, submicron fillers (<1.0 μm particles) are highly efficient at increasing the moduli of the composition. Fillers should have adequate thermal stability to survive the high temperatures (250 to 300° C.) used to mold the compositions of this invention. In any of the above embodiments, preferably the filler is an inorganic mineral filler with a median particle diameter of less than 50 microns.

The classes of materials described herein that are useful as fillers can be utilized alone or admixed to obtain desired properties. In any of the embodiments, filler may be present at 0.1 to 50 wt % (preferably 1 to 40 wt %, preferably 2 to 30 wt %, preferably 5 to 20 wt %) based on the weight of the total composition. Filler content is equated with the wt % ash content as determined by the ISO 3451-1 (A) test method.

Desirable fillers include but not limited to: mineral aggregates (natural or synthetic), fibers, carbon black, graphite, wollastonite, natural and synthetic clays including nanoclays and organoclays, sand, glass beads, and the like, and any other porous or nonporous fillers and supports known in the art.

Preferred natural or synthetic mineral fillers include talc, mica, wollastonite, titanium dioxide, silicon carbide, silica, silicon dioxide and other oxides of silica (precipitated or not), calcium silicate, calcium and barium sulfates, calcium carbonate (calcite), lead carbonate, magnesium silicate, magnesium oxysulfates, antimony oxide, zinc white, lithopone, zircon, corundum, spinel, apatite, Barytes powder, magnesite, dolomite, zinc borate, hydrotalcite compounds of the ions Mg, Ca, or Zn with Al, Cr or Fe and $CO_3$ and/or $HPO_4$ (hydrated or not), quartz powder, hydrochloric magnesium carbonate, alumina, chrome, phosphorous and brominated flame retardants, antimony trioxide, silicone, other metal oxides, other metal carbonates, other metal hydroxides, and blends thereof.

Preferred fibers include glass fibers (long or short), carbon fibers, and natural and synthetic polymer fibers including polyethylene terephthalate (PET) fibers and rayon fibers.

Preferred clays include nanoclays or organoclays to produce a nanocomposite. These clays may comprise one or more of ammonium, primary alkylammonium, secondary alkylammonium, tertiary alkylammonium, quaternary alkylammonium, phosphonium derivatives of aliphatic, aromatic or arylaliphatic amines, phosphines or sulfides or sulfonium derivatives of aliphatic, aromatic or arylaliphatic amines, phosphines or sulfides. The organoclay may be selected from one or more of montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, vermiculite, halloysite, aluminate oxides, hydrotalcite, illite, rectorite, tarosovite, ledikite, and/or florine mica. In another embodiment the filler is a nano-clay with mean particle diameter of less than 1 micron.

In preferred embodiments the filler has a median particle diameter of 0.1-100 microns (preferably 0.5-50 microns, preferably 1 to 20 microns). In other preferred embodiments the filler has a filler shape that is needle-like or plate-like, with an aspect ratio greater than 1.2 (preferably greater than 2, preferably greater than 3, preferably greater than 5, preferably greater than 10, preferably from 2 to 20, preferably from 3-10), where the aspect ratio is the ratio of the longest dimension to the shortest dimension of the particles, on average, and is typically reported by filler manufacturers. In other embodiments the filler has an aspect ratio of essentially 1 (0.9 to 1.1); i.e., it is not needle-like or plate-like but is essentially spherical. In another embodiment, the filler is pulverized. Useful fillers have a specific surface area of 10 to 300 $m^2/cm^3$.

Figure 2:
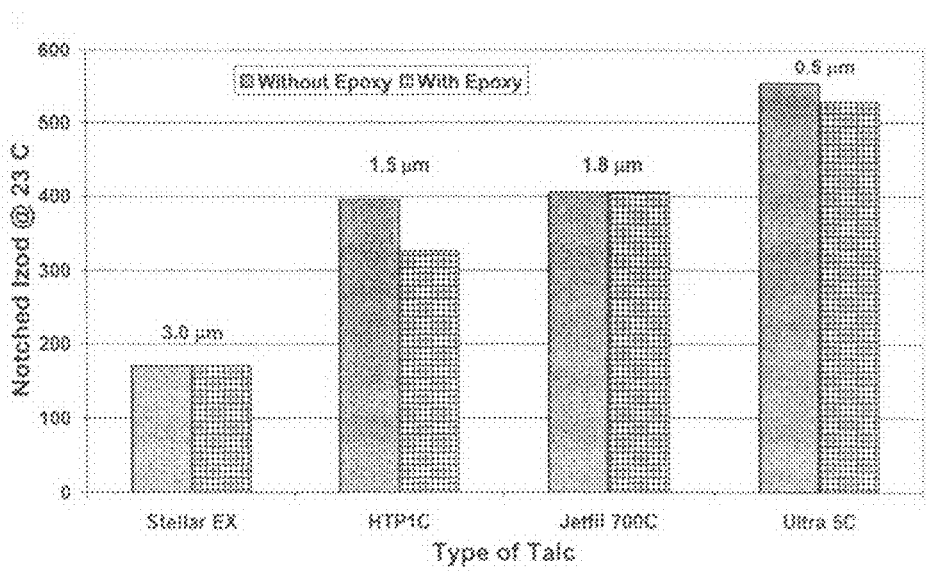
FIG. 2 is a graph comparing the room temperature notched Izod impact resistance of the 60:20:20 Topas 6017/Vistalon 8600/Talc blends of Examples 10 to 17.

Among these fillers, inorganic fillers and particularly talc, mica, and short glass fibers are preferred. More preferred are talc fillers, because molded parts containing talc fillers typically have better surface appearance than molded parts containing fiber filled blends. The type of talc makes a significant difference in the notched Izod impact resistance at 23° C., as shown in FIG. 2. Most preferred is the Imi Fabi Ultra 5C talc, because it is milled down to an average size of 0.5 μm. The type of talc has very little effect on the flexural modulus, FIG. 3. Talcs may be obtained from Luzenac, which is part of Rio Tinto, or from Imi Fabi. Mica or calcium metasilicate is available from Nyco Minerals, and short glass fibers are available from Owens-Corning Fiberglass.

Coupling agents may also be added to the present compositions. Coupling agents are generally thought to improve the mechanical properties of blends by improving adhesion between the fillers and surrounding polymers. Coupling agents need to be compatible (similar in polarity) with the cyclic olefin polymers of these compositions and with the fillers. Often coupling agents are nonpolar polymers with localized polar groups. Some coupling agents like silanes are covalently bound to the fillers to make their surfaces compatible or reactive with the polymer phases. In FIG. 9, it can be seen that silane treated glass fibers give slightly higher notched Izod impacts than untreated fibers and are preferred. However, in FIG. 8, very little effect from treating the glass fibers is seen for the flexural modulus.

Some useful coupling agents for the present compositions are epoxy resins with varying masses between the epoxy groups; ethylene polymers with vinyl acetate, acrylic acid, acrylate esters, methacrylic acid, methacrylate esters; maleic anhydride grafted polyethylene, polypropylene, styrenic block polymers, cyclic olefin polymers, ethylene-propylene polymers, or ethylene-propylene-diene terpolymers; glycidyl methylmethacrylate grafted ethylene-propylene rubber, ethylene-propylene-diene terpolymers, and ethylene vinyl acetate polymers; chlorinated polyethylene and polypropylene; epoxidized natural rubber, ethylene-propylene-diene terpolymers, and alpha olefin-diene polymers: silane grafted cyclic olefin polymers and ethylene polymers; hydroxy grafted ethylene polymers; and hydroxyl functionalized alpha olefin-diene polymers.

Among these coupling agents, epoxy resins, maleic anhydride grafted polypropylene, and maleic anhydride grafted ethylene polymers are preferred. As the loading of epoxy resins is increased from 0% to 1% and then 2%, the flexural modulus of the filled compositions slightly increases, FIG. 5. The lower polarity epoxy resins, such as EPON 1009F or 1007F, give slightly higher flexural moduli. As the loading of epoxy resin increases, the room temperature notched Izod impact resistances significantly decrease, FIG. 4. For balanced compositions requiring high impact strengths and stiffnesses, a loading of about 1 wt. % of epoxy seems to be preferred. For compositions requiring the highest possible impact strength, it is preferable to omit the epoxy resin coupling agent. Exxelor PO 1020 and VA 1803 maleic anhydride grafted polymers can be obtained from ExxonMobil Chemical Company. The epoxy resins, EPON 1001F, EPON 1002F, EPON 1007F, EPON 1009F, and EPON 165, can be purchased from Resolution Performance Products.

Additives

Many additives may be incorporated in the present polymer composition in addition to the cyclic first polymer component, the acyclic second polymer component and the filler. Some additives aid in the processing of molded parts; others are added to improve the stability of aesthetics of molded parts. Useful additives include lactones, hydroxylamines, phosphates, clarifying agents, hindered amine anti-oxidants, aromatic amine anti-oxidants, hindered phenol anti-oxidants, divalent sulfur anti-oxidants, trivalent phosphorus anti-oxidants, metal deactivator anti-oxidants, heat stabilizers, low profile additives, UV stabilizers, lubricants, mold release agents, odorants, antistatic agents, antimicrobial agents, slip agents, anti-blocking agents, anti-foaming agents, blowing agents, anti-fogging agents, titanates, flame retardants, dyes, and colorants. Anti-oxidants and titanates are used in some of the compositions of this invention. Preferred anti-oxidant additives are Irganox 1010, Capow L-12/H, and Irgafos 168 combined with FS-042. Irganox 1010, Irgafos 168, and FS-042 are available from Ciba. Capow L-12/H is a titanate available from Kenrich.

Processing oils can be added in compounding to improve the moldability of the present composition. Plasticizers are added to polymers to lower their glass transition temperatures and to improve impact properties For example, processing oils could be added to the polyolefin modifiers to further lower their glass transition temperatures. Useful processing oils and plasticizers for the compositions of this invention include poly(1-decene), aliphatic petroleum distillates, aromatic petroleum distillates, alicyclic petroleum distillates, wood byproducts, natural oils, and synthetic oils.

In another embodiment, plasticizers such as those described as non-functional plasticizers (NFP's) in WO 04/014998 at pages 9 to 28, particularly pages 16 line, 14 to page 20, line 17) are added to the compositions of this invention.

Crosslinking agents can also be added to the present composition to vulcanize the second polymer component, to create grafts between the cyclic olefin first polymers and the second polymer, to functionalize either the cyclic olefin polymer or the second polymer, and to cure the composition into a thermoset. Useful crosslinking agents include hydrogen peroxide, alkylhydroperoxides, diacylperoxides, dialkylperoxides, peracids, peresters, sulfur with and without accelerators, zinc with benzothiazole acceleration, phenolic resin curatives, silanes with Pt catalysts or free radical initiators, benzoquinone derivatives, bismaleimides, and metal oxides.

Method of Making the Polymer Composition

The present compositions can be prepared by any one of the following methods:

1. Melt blending of a preformed cyclic olefin polymer (also referred to as the first polymer), a preformed polyolefin modifier (also referred to as the second polymer), filler and any other components in a mixer such as a Braebender Plasticorder or a Banbury mixer or in an extruder. A preferred method is a twin screw extruder with a high mixing intensity.
2. Mixing solutions or suspensions of the modifier and the cyclic olefin polymer, possibly followed by extrusion or melt mixing to add filler and any other components.
3. Polymerization in a staged reactor, where the polyolefin modifier is made in the first reactor and the cyclic olefin polymer is made in a second reactor, possibly followed by extrusion or melt mixing to add filler and other components.
4. Polymerization in a staged reactor, where the cyclic olefin polymer is made in a first reactor and a polyolefin modifier is made in a second reactor, possibly followed by extrusion or melt mixing to add filler and other components.
5. Polymerization of the polyolefin modifier in a solvent containing dissolved cyclic olefin polymer, possibly followed by extrusion or melt mixing to add filler and other components.
6. Polymerization of the cyclic olefin polymer in a solvent containing dissolved polyolefin modifier, possibly followed by extrusion or melt mixing to add filler and other components.
7. Polymerization of both the polyolefin modifier and the cyclic olefin polymer in the same reactor using two or more catalysts, possibly followed by extrusion or melt mixing to add filler and other components. A chain shuttle agent may or may not be used to make block polymers in this type of polymerization.
8. Polymerization where the second double bond of a diene in the polyolefin modifier or the cyclic olefin polymer is partially incorporated into other chains of the same type by the polymerization catalyst, leading to long chain branched or gelled polyolefin modifiers or cyclic olefin polymers.
9. Polymerization where the second double bonds of a diene in the polyolefin modifier or cyclic olefin polymer is incorporated into chains of other types of polymers by the polymerization catalyst leading to graft polymers between different polyolefin modifiers, different cyclic olefin polymers, or between a polyolefin modifier and cyclic olefin polymer.
10. Crosslinking where an agent is added during mixing to crosslink a second double bond of either the polyolefin modifiers or the cyclic olefin polymers with other double bonds in the composition, typically leading to long chain branched or gelled polyolefin modifiers or cyclic olefin polymer and/or grafts between polyolefin modifiers, between cyclic olefin polymers, or between polyolefin modifiers and cyclic olefin polymers.
11. Functionalization where the second double bonds of dienes in either cyclic olefin polymers or polymer modifiers or both are functionalized after the cyclic olefin polymers and polymer modifiers are already mixed together by one of the preparation methods 1 through 9.
12. Compositions containing functionalized polyolefin modifiers or cyclic olefin polymers made by preparation methods 1, 2, or 11, which are crosslinked as described in preparation methods 8-10, except that reaction occurs between the functional groups instead of a second double bond.
13. Any combination of the techniques described in preparation methods 1-12.

Polymer Composition

The present polymer composition exhibits may outstanding properties, particularly a room temperature (23° C.) Izod impact resistance of greater than 100 J/m up to nearly 700 J/m. The present composition also provides an excellent balance of properties with a heat distortion temperatures as high as 158° C. using a 0.45 MPa load and as high as 135° C. using a 1.80 MPa load. In addition, the composition has a high flexural modulus, typically 1400 MPa or more, and outstanding low temperature impact properties.

In one embodiment, the polymer composition has a notched Izod impact resistance measured at 23° C. of greater than 150 J/m, for example greater than 200 J/m, such as greater than 300 J/m, even greater than 500 J/m and a flexural modulus (1% secant method) greater than 2000 MPa, such as greater than 2500 MPa, for example greater than 3000 MPa.

In further embodiments, the polymer compositions described herein have a notched Izod impact resistance measured at −18° C. of greater than 50 J/m, such as greater than 100 J/m, for example greater than 150 J/m, even greater than 200 J/m.

In further embodiments, the polymer compositions described herein have a heat distortion temperature measured using a 0.46 MPa load of greater than 85° C., for example greater than 100° C., such as greater than 115° C., even greater than 130° C.

In further embodiments, the polymer compositions described herein have an instrumented impact energy measured at 23° C. of greater than 15 J, for example greater than 25 J.

In further embodiments, the polymer compositions described herein have a notched Izod impact resistance measured at −18° C. of greater than 50 J/m, such as greater than 100 J/m, for example greater than 150 J/m, even greater than 200 J/m; and a heat distortion temperature measured using a 0.46 MPa load of greater than 85° C., for example greater than 100° C., such as greater than 115° C., even greater than 130° C.; and an instrumented impact energy measured at 23° C. of greater than 15 J, for example greater than 25 J.

Production of Articles

Articles can be formed using the present composition by injection molding, compression molding, transfer molding, reaction injection molding, thermoforming, pressing, rotational molding, blow molding, extrusion, extrusion covering, co-extrusion with other polymers, pultrusion alone or with other polymeric materials, lamination with other polymers, coating, fiber spinning, film blowing, film casting, calendaring, or casting. Articles can also be made by any of these methods, where double bonds remaining in the polyolefin modifier or cyclic olefin polymer or their functional groups are crosslinked after the articles are formed either thermally or with one of the crosslinking agents.

The present polymer composition opens up many new applications for cyclic olefin polymers. Since the present composition overcomes or alleviates the problem with brittleness of cyclic olefin polymers, it can be used in most of the applications where other engineering thermoplastics are used. The present compositions can be used to make toughened, reinforced, compositions with all types of cyclic olefins and represents a major step forward for these materials.

The polymer compositions described herein are specifically useful for the fabrication of parts of an automobile including:
1. Chassis, mechanics and under the hood applications including gas tanks; bumpers beams; bumper energy absorbers; bumper fascias; grille opening reinforcements; grille opening panels; front end fascia and grilles; front end modules; front end carriers; bolsters; valve covers; rocker arm covers; cylinder head covers; engine covers; engine splash shields; engine timing belt covers; engine air cleaners; engine oil pans; battery cases and trays; fluid reservoirs; cooling system components including cooling fans and shrouds and supports and radiator supports and end tanks; air intake system components; air ducting; wheel covers; hub caps; wheel rims; suspension and transmission components; and switches and sockets.
2. Interior applications including parts of instrument panels (IP) including IP carriers and retainers, IP basic structures, IP uppers, IP lowers, and IP instrument clusters; air bag housings; interior pedals; interior consoles including center and overhead consoles and console trim; steering column housings; seat structures including seat backs and pans; interior trim including pillar trim, IP trim, and door trim panels; liftgate and hatch inner panels; door and window handles; HVAC housing; load floors; trunk liners; storage systems; package trays; door cores and door core modules.
3. Body applications including underbody panels and streamlining; rocker panels; running boards; pickup boxes; vertical body panels including fenders, quarter panels, liftgate and hatch outer panels, and door outer panels; horizontal body panels including hoods, trunks, deck lids, and roofs and roof modules; spoilers; cowl vent leaf catchers, grilles, and screens; spare wheel wells; fender liners; exterior trim; exterior door handles; signal lamp-housings; head and rear lamp housings; and mirror housings.

The polymer compositions described herein can also be used to fabricate parts similar to those listed for automobiles but for heavy trucks and mass transit vehicles, such as buses, trains, and airplanes, as well as for recreational vehicles such as snowmobiles, all-terrain vehicles, sailboats, powerboats, and jet skis. Other uses for the polymer compositions described herein include the fabrication of (a) recreational goods such as toys, helmets, bicycle wheels, pool equipment housings, and rackets; (b) parts for large consumer appliances, such as washing machine tubs, refrigerator interior liners, and appliance exterior housings; (c) housings for business machines, hand tools, laboratory instruments, electronic equipment, small machinery and appliances; (d) parts for furniture; (e) structural elements in residential and commercial building and construction such as exterior panels and curtain walls, window and door frames, fascia and soffits, shutters, and HVAC components; and (f) fabricate large waste management containers.

In the foregoing description, the Examples and the claims, the following test methods are employed to measure the various parameters identified.

Heat distortion temperatures (HDT) were measured using ASTM methods D648-06 and D1525-00. Before testing, the samples were conditioned for at least 40 hours @ 23° C.±2° C. and 50%±5% humidity. ASTM test bars were 0.125" thick×5" wide×5" length.

Density or specific gravity was measured using ASTM D972-00 Method A. Specimens were cut with a clipper belt cutter from the center portion of standard flexular modulus test samples. The length of the samples were approximately 3½ inches. Before testing, the samples were conditioned at 23±2° C. and 50±5% relative humidity for a minimum of 40 hours.

Maximum tensile stress, tensile Young's modulus, and tensile energy at break were measured using ASTM method D638-03. At least five specimens per sample were tested. Before testing, the samples were conditioned for 40 hours at 23° C.±2° C. and 50%±5% relative humidity in bags.

Flexural Young's modulus, flexural modulus at 1% tangent, and flexural modulus at 1% secant were collected according to ASTM method D790-03. At least five specimens per sample were tested. Before testing, the samples were conditioned for 40 hours at 23° C.±2° C. and 50%±5% relative humidity in bags.

Room temperature (23° C.) and low temperature (−18° C.) notched Izod resistance values were measured according to ASTM method D256-06. The test specimens were 2.5 inches long, 0.5 inches wide, and 0.125 inches thick. At least five specimens were cut using a clipper belt cutter from the uniform center of Type 1 tensile bars. Samples were notched using a TMI Notching cutter. Samples were conditioned at 23±2° C. and 50±5% relative humidity for a minimum of 40 hours after cutting and notching. For sub-ambient testing, notched test specimens were conditioned at the specified test temperature for a minimum of one hour before testing. The types of break observed in the notched Izod impact tests are coded as follows:

C means complete break,
NB means no break,
P is a partial break where the top stays above the line of the break, and
H is a hinged partial break where the top portion hangs below the line of the break.

Instrumented impact at room temperature, −18° C., and −29° C. were measured according to ASTM method D3763-02. Standard test specimens are 4.0 in. diameter disks. A minimum of five specimens were tested for each sample at each temperature. Before testing, samples were conditioned at 23±2° C. and 50±5% relative humidity for a minimum of 40 hours. If high or low temperature testing was performed, the specimens to be tested were conditioned for 4 hours prior to testing. The types of breaks observed in the instrumented impact tests are coded as follows:

B means a brittle failure,
BD means a brittle failure showing some ductile flow,
DB is a ductile failure where the polymer has deformed out of the way of the projectile but has cracked,
D is a failure where the polymer deformed out of the way of the projectile without any cracking.

The 60 degree gloss measurements used ASTM method 523-89. Samples were free of dust, scratches or finger marks.

Rockwell hardness was measured using ASTM 785-03 procedure A and ASTM 618-05. Samples were conditioned at 23±2° C. and 50±5% relative humidity for a minimum of 40 hours. The standard test specimens were at least 6 mm (¼ in.) thick.

Melt flow rates at 230° C. and 300° C. were measured according to ASTM method D1238-04c.

Shore A and D hardness were collected using ASTM method D2240-05. The test specimens were at least 6 mm (0.25 inches) thick.

All molecular weights are number average unless otherwise noted and can be measured using size exclusion chromatography according to ASTM method D5296.

Bicerano solubility parameters were determined by the Van Krevelen method described in chapter 5 of Jozef Bicerano's *Prediction of Polymer Properties*, $3^{rd}$ Edition, Marcel Dekker, Inc., 2002. A programmed version of this method was used in the example tables. It is available in the Polymer Module of the molecular modeling software package, $Cerius^2$, version 4.0, available from Accelrys, Inc.

This invention further relates to:

1. A polymer composition comprising:
   (a) at least 40 wt % (based upon the weight of the composition) of a cyclic olefin polymer, said cyclic olefin polymer comprising at least one acyclic olefin and at least 20 wt % (based upon the weight of the cyclic olefin polymer) of one or more cyclic olefins, wherein at least a portion of said cyclic olefin polymer has a glass transition temperature of greater than 100° C.;
   (b) an acyclic olefin polymer modifier in an amount up to 40 wt % (based upon the weight of the composition); and
   (c) at least 10 wt % (based upon the weight of the composition) of one of more fillers,
   wherein the notched Izod impact resistance of the composition measured at 23° C. is greater than 100 J/m and the flexural modulus (1% secant method) of the composition is greater than 1400 MPa.
2. The polymer composition of paragraph 1 wherein said cyclic olefin polymer comprises at least 30 wt %, preferably at least 40 wt %, of said one or more cyclic olefins.
3. The polymer composition of paragraph 1 or paragraph 2 wherein at least a portion of said cyclic olefin polymer has a glass transition temperature of greater than 120° C., preferably greater than 140° C., more preferably greater than 160° C.
4. The polymer composition of any one of paragraphs 1 to 3 wherein all of said cyclic olefin polymer has a glass transition temperature of greater than 100° C.
5. The polymer composition of any one of paragraphs 1 to 4 wherein said composition comprises from 15 wt % to 40 wt %, preferably from 20 wt % to 30 wt % of the polymer modifier.
6. The polymer composition of any one of paragraphs 1 to 5 wherein at least a portion of the polymer modifier has a glass transition temperature of less than −30° C., preferably less than −40° C., more preferably less than −50° C.
7. The polymer composition of any one of paragraphs 1 to 6 wherein no portion of the polymer modifier has a softening point greater than +30° C., preferably greater than +10° C.
8. The polymer composition of any one of paragraphs 1 to 7 wherein the Bicerano solubility parameter of the polymer modifier is up to 0.6 $J^{0.5}/cm^{0.5}$, preferably between 0.1 and 0.5 $J^{0.5}/cm^{1.5}$, more preferably between 0.12 and 0.4 $J^{0.5}/cm^{1.5}$, less than the Bicerano solubility parameter of the cyclic olefin polymer.

9. The polymer composition of any one of paragraphs 1 to 8 and comprising from 10 wt % to 40 wt %, preferably from 15 to 30 wt % of said filler.
10. The polymer composition of any one of paragraphs 1 to 9 wherein the filler is selected from mineral aggregates (natural or synthetic), fibers, carbon black, graphite, wollastonite, natural and synthetic clays including nanoclays and organoclays, sand, glass beads, and mixtures thereof.
11. The polymer composition of any one of paragraphs 1 to 10 wherein the filler comprises at least one glass fibers, carbon fibers, polyethylene terephthalate (PET) fibers and rayon fibers.
12. The polymer composition of any one of paragraphs 1 to 11 wherein the filler is an inorganic material.
13. The polymer composition of any one of paragraphs 1 to 12 wherein the filler is selected from talc, mica, glass fibers and mixtures thereof.
14. The polymer composition of any one of paragraphs 1 to 13 wherein the filler has a median particle diameter of 0.1 to 100 microns, preferably 0.5-50 microns.
15. The polymer composition of any one of paragraphs 1 to 14 and further comprising a coupling agent to improve the adhesion between the filler and the cyclic olefin polymer.
16. The polymer composition of paragraph 15 wherein the coupling agent comprises at least one of an epoxy resin, a maleic anhydride grafted polypropylene, and a maleic anhydride grafted ethylene polymer.
17. The polymer composition of any one of paragraphs 1 to 16 and having a notched Izod impact resistance measured at 0.23° C. of greater than 150 J/m, preferably greater than 200 J/m, more preferably greater than 300 J/m, most preferably greater than 500 J/m.
18. The polymer composition of any one of paragraphs 1 to 17 and having a flexural modulus (1% secant method) greater than 2000 MPa, preferably greater than 2500 MPa, more preferably greater than 3000 MPa.
19. The polymer composition of any one of paragraphs 1 to 18 and having a notched Izod impact resistance measured at −18° C. of greater than 50 J/m, preferably greater than 100 J/m, more preferably greater than 150 J/m, most preferably greater than 200 J/m.
20. The polymer composition of any one of paragraphs 1 to 19 and having a heat distortion temperature measured using a 0.46 MPa load of greater than 85° C.
21. The polymer composition of any one of paragraphs 1 to 20 and having a heat distortion temperature measured using a 0.46 MPa load of greater than 100° C., preferably greater than 115° C., more preferably greater than 130° C.
22. The polymer composition of any one of paragraphs 1 to 21 and having an instrumented impact energy measured at 23° C. of greater than 15 J, preferably greater than 25 J.
23. The polymer composition of any one of paragraphs 1 to 22 wherein said polymer modifier comprises a polymer of ethylene, a higher alpha-olefin, and at least 5 wt % but less than 20 wt % of a cyclic olefin.
24. The polymer composition of paragraph 23 wherein the cyclic olefin is selected from norbornene, ethylidene norbornene, vinylnorbornene, vinylcyclohexene and dicyclopentadiene.
25. The polymer composition of paragraph 23 or paragraph 24 wherein the alpha olefin is selected from propylene, hexene and octene.
26. The polymer composition of any one of paragraphs 1 to 22 wherein said polymer modifier comprises a polymer comprising ethylene, propylene, and optionally one or more dienes.
27. The polymer composition of paragraph 26 wherein the polymer comprises from 25 to 80 wt % of ethylene, up to 15 wt % of one or more dienes and the balance propylene.
28. The polymer composition of any one of paragraphs 1 to 22 wherein said polymer modifier comprises a polymer of ethylene and 7-methyl-1,6-octadiene.
29. The polymer composition of any one of paragraphs 1 to 28 wherein said cyclic olefin polymer comprises a copolymer of ethylene with norbornene and/or dicyclopentadiene.
30. The polymer composition of any one of paragraphs 1 to 29 wherein some or all of the remaining double bonds of the cyclic olefin polymer are hydrogenated, epoxidized and/or functionalized.
31. The polymer composition of any one of paragraphs 1 to 30 and comprising a melt blend of said cyclic olefin polymer (a) and said polymer modifier (b).
32. A component for an automobile fabricated from the polymer composition of any one of paragraphs 1 to 31.

EXAMPLES

The invention will now be more particularly described with reference to the following non-limiting Examples.
The following materials were used in Examples:

| Material | Source | Properties |
| --- | --- | --- |
| Vistalon 8600 | ExxonMobil Chemical Company | Bimodal EPDM rubber containing 57 wt % ethylene, 8.9 wt. % ethylidene norbornene, 34.1 wt. % propylene. Tg is −45.15° C. and rubber has no other feature (no softening point) in its DSC trace run at 10° C./min. |
| Vistalon 9500 | ExxonMobil Chemical Company | Bimodal EPDM rubber containing 60 wt. % ethylene, 11 wt. % ethylidene norbornene, 29 wt. % propylene. Tg is −41.64° C. and rubber has no other feature (no softening point) in its DSC trace run at 10° C./min. |
| Vistalon 7001 | ExxonMobil Chemical Company | Metallocene based bimodal EPDM containing 73 wt. % ethylene, 5 wt. % ethylidene norbornene, 22 wt. % propylene. Tg is −39.13° C. and rubber has a melting peak at 45° C. in its DSC trace. |
| Exxelor PO 1020 | ExxonMobil Chemical Company | Homopolymer of PP grafted with 0.5-1.0 wt. % maleic anhydride. MPt of 160° C. |
| Exxelor VA 1803 | ExxonMobil Chemical Company | Amorphous ethylene polymer grafted with 0.5-1.0 wt. % maleic anhydride. Glass transition temperature of −57° C. |
| MDV91-9 | ExxonMobil Chemical Company | Ethylene-propylene polymer containing 59.3 wt. % ethylene |

-continued

| Material | Source | Properties |
| --- | --- | --- |
| Exact 5061 | ExxonMobil Chemical Company | Metallocene based ethylene-octene polymer with melting point of 52.8° C. |
| PP8231E1 | ExxonMobil Chemical Company | High impact propylene polymer with HDT at 0.46 MPa of 92° C. |
| Vector 8508 | Dexco Polymer LP | Linear styrene-butadiene-styrene block polymer containing 29 wt. % styrene |
| Kraton G1650 | Kraton | Linear styrene-ethylene/butylene-styrene block polymer containing 30 wt. % styrene, Brookfield viscosity 8000 cps. |
| Kraton G1651 | Kraton | Linear styrene-ethylene/butylene-styrene block polymer containing 33 wt. % styrene, Brookfield viscosity >50,000 cps |
| Kraton G1652 | Kraton | Linear styrene-ethylene/butylene-styrene block polymer containing 30 wt. % styrene, Brookfield viscosity 1800 cps |
| Septon 2004 | Kuraray | Styrene-ethylene/propylene-styrene block polymer containing 18 wt. % styrene, solution viscosity 145 cps |
| Septon 2007 | Kuraray | Styrene-ethylene/propylene-styrene block polymer containing 30 wt. % styrene, solution viscosity 70 cps |
| Septon HG-252 | Kuraray | Styrene-ethylene-ethylene/propylene-styrene block polymer containing 28 wt. % styrene, solution viscosity 70 cps |
| Topas 6015 | Topas Advanced Polymers | Metallocene-based Ethylene/Norbornene polymer with HDT at 0.46 MPa of 150° C. and Tg of 160° C. |
| Topas 6017 | Topas Advanced Polymers | Metallocene-based Ethylene/Norbornene polymer with HDT at 0.46 MPa of 170° C. and Tg of 180° C. |
| Jetfil 700C | Luzenac, Rio Tinto | Talc, 1.8 µm |
| HTP1C | Imi Fabi | Talc, 1.5 µm |
| Ultra 5C | Imi Fabi | Talc, 0.5 µm |
| Stellar EX | Luzenac/Rio Tinto | Talc, 3 µm |
| Wollastonite NG-4 | Nyco Minerals | Calcium Metasilicate, 4.5 µm |
| Epon 1002F | Resolution Performance Products | Solid epoxy resin with 600-700 g of polymer/equivalent of epoxy |
| Epon 1001F | Resolution Performance Products | Solid epoxy resin with 525-550 g of polymer/equivalent of epoxy |
| Epon 1007F | Resolution Performance Products | Solid epoxy resin with 1700-2300 g of polymer/equivalent of epoxy |
| Epon 1009F | Resolution Performance Products | Solid epoxy resin with 2300-3800 g of polymer/equivalent of epoxy |
| Epon 165 | Resolution Performance Products | Epoxy Novolac resins with 200-230 g of polymer/equivalent of epoxy |
| Irganox 1010 | Ciba | Antioxidant |
| Irgafos 168 | Ciba | Phosphite |
| FS-042 | Ciba | Antioxidant |
| Capow L-12/H | Kenrich | Titanate |
| OC CS-144-14A | Owens-Corning | Chopped Glass Strands, 13 µm dia., untreated |
| OC CS-147-14P | Owens-Corning | Chopped Glass Strands, 14 µm dia., silane treated |

Test Sample Preparation

The injection molded blends were melt mixed at 230° C. in a Warner-Pflider WP-30 mm twin screw extruder. A total of ten pounds of ingredients were added through the throat of the extruder. The first two pounds were discarded. Test samples were fabricated at 250° C. using a 110 ton Van Dorn injection molding machine. The first 15 shots were discarded.

Examples 1 to 4 and Comparative Examples 5 and 6

In Table 1 examples are presented of Topas 6017 toughened with Vistalon 8600 and MDV91-9 and filled (reinforced) with talc and mica. The materials are stiffer than the unreinforced specimen (Comparative Example 5 in Table 1). The flexural modulus (1% secant) increased from 2151 MPa (Comparative Example 5) up to 2537 MPa with 20 wt. % Jetfil 700 C talc (Example 1) and to 2324 MPa with Wollastonite NG-4 mica (Example 2). Surprisingly, the room temperature notched Izod impact resistance also increased from 191.1 J/m in Comparative Example 5 up to 539.1 J/m in Example 1, when the talc filler was added. Apparently, the addition of the talc filler to the 80:20 Topas 6017/Vistalon 8600 blends helps to more finely disperse the elastomer domains, significantly improving the impact toughness of these blends.

FIG. 1 compares the properties of the blend of Example 1 with those a state-of-the-art compounded polypropylene, ExxonMobil AS65 KW-1ATM, which is used around the world for interior structural applications in automobiles. The blend of Example 1 has higher heat distortion temperature at 0.46 MPa (157° C. vs. 124° C.), because of the high glass transition temperature of Topas 6017. The blend also has higher room temperature notched Izod impact resistance (539 vs. 400 J/m), higher flexural modulus (1% tan) (2610 vs. 2400 MPa), and higher tensile stress at yielding (38 vs. 24 MPa). The Rockwell hardness (84 vs. 87) and densities (1.12 vs. 1.07 g/ml) are almost the same. The blend of Example 1 clearly can be used in many new automotive applications requiring simultaneously high heat distortion temperatures, high stiffness, and high impact resistances.

In general the talc reinforcements worked well.

Examples 3 and 4 of Table 1 are blends of Topas 6017 with an ethylene-propylene polymer, MDV91-9.

TABLE 1

Injection Molded - Comparison of Talc and Mica Fillers

|  | Ex. 1 | Ex. 2 | Ex. 3 | Ex. 4 | Comp. Ex. 5 | Comp. Ex. 6 |
|---|---|---|---|---|---|---|
| Topas 6017 (pph) | 59.6 | 59.6 | 59.9 | 59.6 | 79.9 | 56.9 |
| Vistalon 8600 (pph) | 20.0 | 20.0 |  |  | 20.0 |  |
| MDV91-9 (pph) |  |  | 20.0 | 20.0 |  | 20.0 |
| Talc - Jetfil 700C | 20.0 |  | 20.0 |  |  |  |
| Wollastonite NG-4 |  | 20.0 |  | 20.0 |  | 20.0 |
| Irgafos168 | 0.1 | 0.1 | 0.1 | 0.1 | 0.1 | 0.1 |
| Capow L-12/H | 0.3 | 0.3 |  | 0.3 |  |  |
| Exxelor PO-1020 |  |  |  |  |  | 3.0 |
| Density (g/ml) | 1.12 | 1.128 | 1.114 | 1.117 | 0.993 | 1.111 |
| Flex Young's Mod. (MPa) | 2800 | 2500 | 2700 | 2500 | 2200 | 2200 |
| Flex Mod (1% tan) (MPa) | 2613 | 2399 | 2765 | 2510 | 2096 | 2282 |
| Flex Mod (1% sec) (MPa) | 2537 | 2324 | 2530 | 2324 | 2151 | 2055 |
| HDT at 0.46 MPa (C.) | 157 | 154 | 162 | 155 | 159 | 154 |
| HDT at 1.80 MPa (C.) | 134 | 130 | 141 | 131 | 138 | 128 |
| RT Notched Izod (J/m) | 539.1 | 116.4 | 223.7 | 118.0 | 191.1 | 96.1 |
| Type of Breaks | 5NB | 5P | 5P | 5H | 5P | 5H |
| Notched Izod @ −18 C. (J/m) | 90.2 | 32.6 | 71.0 | 27.1 | 126.0 | 43.0 |
| Type of Breaks | 5C | 5C | 5C | 5C | 5H | 5C |
| CLTE ($10^{-5}$/C.) Flow (−30 to 100 C.) | 5.5 |  | 4.8 |  |  | 5.4 |
| CLTE ($10^{-5}$/C.) X-Flow (−30 to 100 C.) | 6.9 |  | 6.6 |  |  | 9.4 |
| 60 deg. Gloss | 33.5 | 28.3 | 33.7 | 29.5 | 42.8 | 20.4 |
| Inst. Impact @ RT (J) 15 mph, 25# | 16.72 | 16.57 | 18.67 | 13.72 | 34.93 | 14.78 |
| Type of Breaks | 5DB | 5B | 5B | 5B | 3DB; 2D | 5B |
| Max Tensile Stress (MPa) | 38.31 | 38.51 | 40.42 | 39.58 | 42.66 | 37.31 |
| Tensile Young's Modulus (MPa) | 3508 | 3242 | 3221 | 3026 | 2394 | 2601 |
| Tensile Energy @ Break (J) | 5.02 | 4.34 | 1.76 | 2.30 | 7.19 | 2.44 |
| Tensile Strain @ Break (%) | 8 | 6.9 | 3.1 | 4 | 10 | 4.3 |
| Tensile Yield Strain (%) | 2.8 | 3.1 | 2.7 | 2.9 | 3.5 | 3 |
| Rockwell Hardness | 86.8 | 87.8 | 84.2 | 93.7 | 104.6 | 78.5 |
| Melt Flow @ 300 C. | 3.5 | 4.5 | 9.0 | 9.9 | 6.4 | 8.0 |
| Shore A Hardness | 78 | 79 | 76 | 76 | 81 | 75 |
| Shore D Hardness | 74 | 74 | 71 | 72 | 77 | 69 |

In an attempt to improve the performance of the Wollastonite mica, a coupling agent, maleic anhydride grafted polypropylene, was added to Comparative Example 6. However, in this case, use of the coupling agent led to both lower stiffness and toughness results.

Comparative Example 7 and Examples 8 and 9

In Table 2 examples are presented of Topas 6017 toughened with Vistalon 8600 and filled (reinforced) with talc and/or mica, in which an epoxy resin EPON 1002 was used as a coupling agent. For the Topas 6015/Nistalon 8600/Wollastonite blend, it will be seen that the addition of the epoxy resin coupling led to a significant increase in stiffness (3137 MPa in Comparative Example 7 vs. 2324 MPa in Example 2 for 1% secant flexural modulus) accompanied by a small decrease in room temperature notched Izod resistance (95 vs. 116 J/m). Example 8 has higher stiffness, 2703 MPa vs. 2537 MPa for Example 1 (1% secant flexural modulus) and lower toughness, 398 J/m vs. 539 J/m for Example 1 (RTNI), while Example 9 has lower stiffness, 2213 MPa vs. 2537 MPa for Example 1 (1% secant flexural modulus) and higher toughness (566 J/m vs. 539 J/m for Example 1 (RTNI). It will be seen that Example 9 is another example of an outstanding balanced blend.

TABLE 2

Injection Molded - Comparison of Talc and Mica

|  | Comp. Ex. 7 | Ex. 8 | Ex. 9 |
|---|---|---|---|
| Topas 6017 (pph) | 58.8 | 58.8 | 58.9 |
| Vistalon 8600 (pph) | 20 | 20 | 20 |
| Talc - Jetfil 700C |  | 20 | 20 |
| Wollastonite NG-4 | 20 |  |  |
| Irgafos 168 | 0.1 | 0.1 | 0.1 |
| FS-042 | 0.1 | 0.1 |  |
| Epon 1002 (Epoxy) | 1.0 | 1.0 | 1.0 |
| Density (g/ml) | 1.14 | 1.123 |  |
| Flex Young's Modulus (MPa) | 3375 | 2922 |  |
| Flex Mod (1% tan) (MPa) | 3289 | 2951 | 2351 |
| Flex Mod (1% sec) (MPa) | 3137 | 2703 | 2213 |
| HDT at 0.45 MPa (C.) | 154 | 158 |  |
| HDT at 1.80 MPa (C.) | 128 | 135 |  |
| RT Notched Izod (J/m) | 95.2 | 397.5 | 565.8 |
| Type of Break | 5P | 5NB |  |
| Notched Izod @ −18 C. (J/m) | 39.6 | 127.7 | 176.1 |
| Type of Break | 5C | 5P |  |
| Inst. Impact @ RT (J) 5 mph, 117# | 23.97 | 37.05 |  |
| Type of Break | 4BD; 1B | 5D |  |
| Inst. Impact @ −29 C. (J) 5 mph 117# |  | 42.19 |  |
| Type of Break |  | 4D |  |
| Inst. Impact @ RT (J) 15 mph, 25# | 23.37 | 37.42 |  |
| Type of Break | 3BD; 2B | 5D |  |
| Inst. Impact @ −29 C. (J) 15 mph 25# | 5.00 | 8.54 |  |
| Type of Break | 5B | 3BD; 2B |  |
| Max Tensile Stress (MPa) | 40.44 | 37.99 | 37.20 |

TABLE 2-continued

Injection Molded - Comparison of Talc and Mica

|  | Comp. Ex. 7 | Ex. 8 | Ex. 9 |
|---|---|---|---|
| Tensile Young's Modulus (MPa) | 3189 | 3564 | 2682 |
| Tensile Energy @ Break (J) |  | 3.53 | 4.34 |
| Tensile Strain @ Break (%) |  | 5.3 | 6.9 | 13.7 |
| Tensile Yield Strain (%) |  | 2.4 | 2.7 | 3.1 |
| Rockwell Hardness |  | 97.66 | 92.7 |  |
| Melt Flow @ 300 C. |  | 3.1 | 1.6 |  |
| Shore A Hardness |  |  |  |  |
| Shore D Hardness |  | 67 | 65 |  |

Examples 10 to 17

To further investigate the effects of the type of talc and the presence or absence of the epoxy resin as a coupling agent, a study of four types of talc, with and without epoxy resin, is presented in Tables 3 and 4. A comparison of room temperature notched Izod impact resistances is shown in FIG. 2. As the size of the talc decreases (shown at the top of the bars), the impact resistance steadily increases. The 0.5 mm Imi Fabi Ultra 5C talc was the best talc. The blends with this small talc had impact resistances about 3 times higher than blends with the large talc.

TABLE 3

Injection Molded - Effect of Talc Type

|  | Ex. 10 | Ex. 11 | Ex. 12 | Ex. 13 |
|---|---|---|---|---|
| Topas 6017 | 59.9 | 58.9 | 59.9 | 58.9 |
| Vistalon 8600 | 20 | 20 | 20 | 20 |
| Jetfil 700C | 20 | 20 |  |  |
| Imi Fabi HTP1C |  |  | 20 | 20 |
| EPON 1002 |  | 1 |  | 1 |
| Irgafos 168 | 0.1 | 0.1 | 0.1 | 0.1 |
| Tens @ Yield (MPa) | 40.69 | 41.06 | 41.15 | 39.29 |
| Strain @ Yield (%) | 3.3 | 3.2 | 3.5 | 3.3 |
| Strain @ Break (%) | 13.2 | 11.6 | 18.4 | 14 |
| Young's Modulus (MPa) | 2753 | 2772 | 2854 |  |
| Flex Mod 1% sec (MPa) @ 0.05 in/min | 2234 | 2241 | 2282 | 2261 |
| Flex Mod 1% Tan (MPa) @ 0.05 in/min | 2372 | 2496 | 2351 | 2517 |
| HDT @ 0.46 MPa (C.) | 158.2 | 155.8 | 157.6 | 156.9 |
| HDT @ 0.46 MPa (C.) | 134 | 131.3 | 133.9 | 131.7 |
| Notched Izod @ 23 C. (J/m) | 405.7 | 405.7 | 395.0 | 325.6 |
| Notched Izod @ -18 C. (J/m) | 58.7 | 64.1 | 74.7 | 69.4 |

TABLE 4

Injection Molded - Effect of Talc Type

|  | Ex. 14 | Ex. 15 | Ex. 16 | Ex. 17 |
|---|---|---|---|---|
| Topas 6017 | 59.9 | 58.9 | 59.9 | 58.9 |
| Vistalon 8600 | 20 | 20 | 20 | 20 |
| Imi Fabi Ultra 5C | 20 | 20 |  |  |
| Stellar EX |  |  | 20 | 20 |
| EPON 1002 |  | 1 |  | 1 |
| Irgafos 168 | 0.1 | 0.1 | 0.1 | 0.1 |
| Tens @ Yield (MPa) | 38.92 | 38.81 | 40.71 | 38.65 |
| Strain @ Yield (%) | 3.4 | 3.4 | 3.4 | 3.3 |
| Strain @ Break (%) | 12 | 15 | 12 | 9 |
| Flex Mod 1% sec (MPa) @ 0.05 in/min | 2227 | 2234 | 2324 | 2317 |
| Flex Mod 1% Tan (MPa) @ 0.05 in/min | 2586 | 2303 | 2468 | 2523 |
| HDT @ 0.46 MPa (C.) | 156.8 | 156.5 | 157.7 | 156.2 |
| HDT @ 1.80 MPa (C.) | 133.5 | 130.9 | 134.5 | 131.4 |
| Notched Izod @ 23 C. (J/m) | 555.1 | 528.4 | 170.8 | 170.8 |
| Notched Izod @ -18 C. (J/m) | 80.1 | 69.4 | 42.7 | 48.0 |

Figure 3:
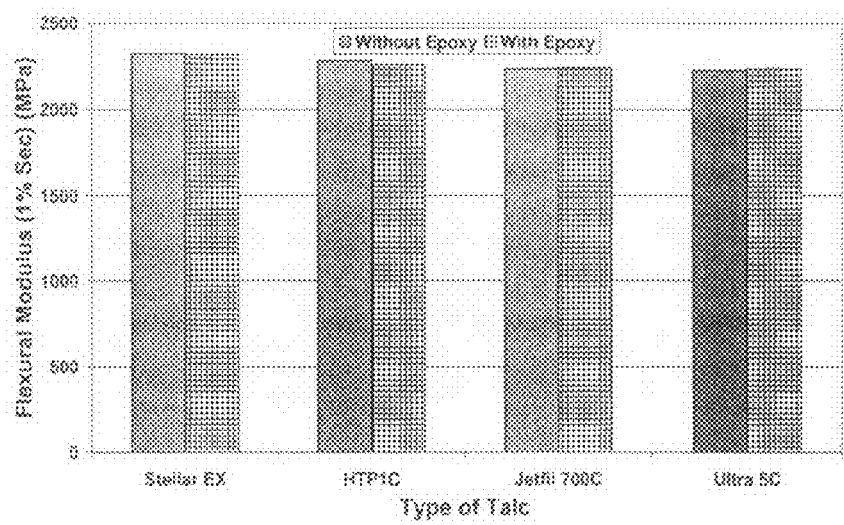
FIG. 3 is a graph comparing the flexural modulus (1% secant) of the 60:20:20 Topas 6017/Vistalon 8600/Talc blends of Examples 10 to 17.

A comparison of flexural modulus (1% secant) is presented in FIG. 3. The type of talc used has a very minor effect on the stiffness of these blends. The blends containing the smallest talc are about 4% less stiff than those with the largest talc. Combining the effects on impact and stiffness, blends with a greatly improved balance of properties can be prepared with small particle size talcs, such as Imi Fabi Ultra 5C. The blends of Examples 14 and 15 in Table 4 have impact resistance values in excess of 500 J/m target, whereas all the samples reported in Tables 3 and 4 meet the 100 J/m room temperature notched Izod impact target for the present composition.

Also shown in FIGS. 2 and 3 are the effects of using EPON 1002 in these blends. In some of the examples, 1 wt. % EPON 1002 slightly lowered the room temperature notched Izod impact values, but overall the addition of the epoxy resin had very little effect. The use of the epoxy resin had almost no effect on the stiffness of the blends.

Examples 18 to 28

Figure 4:
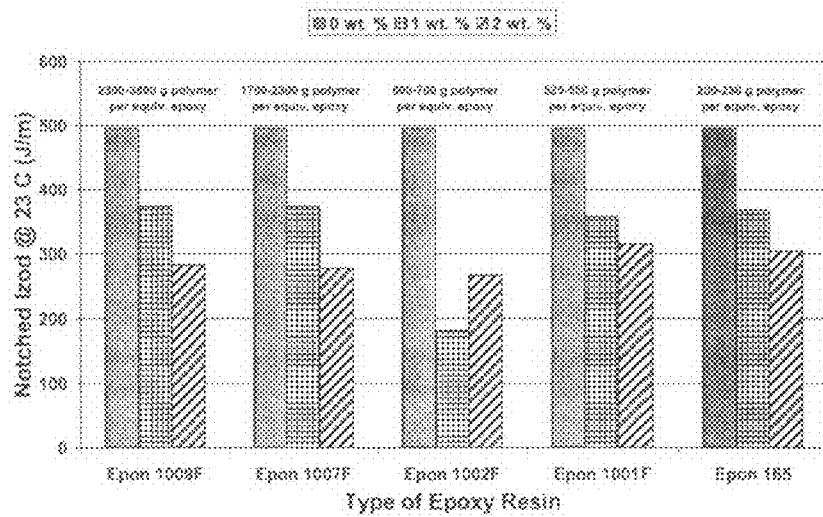
FIG. 4 is a graph showing the effect of adding various epoxy resins as coupling agents on the room temperature notched Izod impact resistance of the 60:20:20 Topas 6017/Vistalon 8600/Talc blends of Examples 18 to 28.
Figure 5:
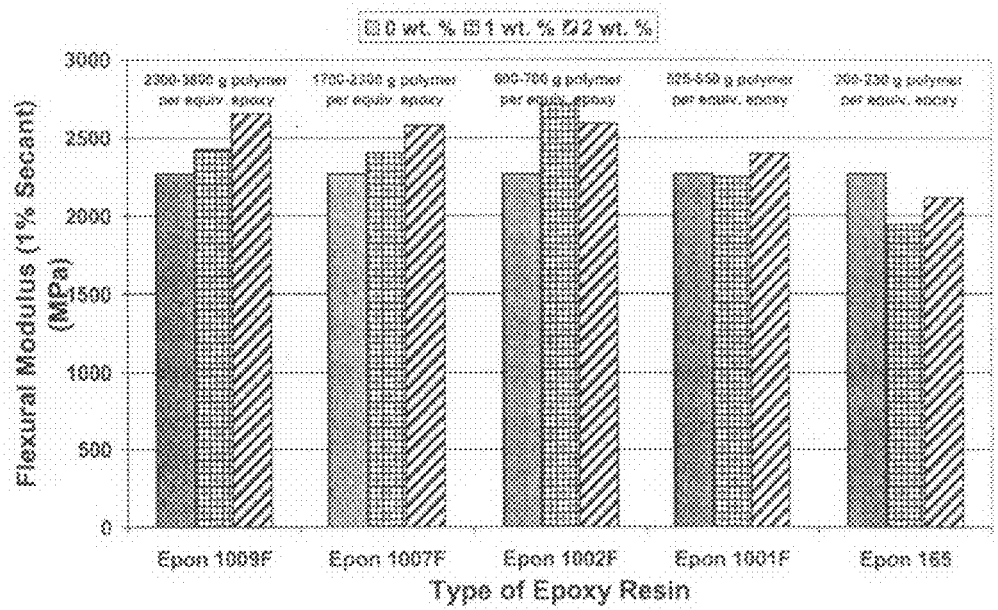
FIG. 5 is a graph showing the effect of adding various epoxy resins as coupling agents on the flexural modulus (1% secant) of the 60:20:20 Topas 6017/Vistalon 8600/Talc blends of Examples 18 to 28.

In FIG. 4 and Tables 5 and 6, the effects of epoxy type and loading are illustrated for the room temperature notched Izod resistance of 60:20:20 Topas 6017/Vistalon 8600/Jetfil 700C talc blends. As more epoxy resin is used in these blends, the room temperature notched Izod values decrease. The epoxy resins increase in polarity from left to right in FIG. 4. The more polar epoxy resins seem to give slightly higher impact resistances when loaded with 2 wt. % epoxy, although the effect is small. Values of the flexural modulus (1% secant) are plotted for these same blends in FIG. 5. As the amount of epoxy resin used in the blends increases, the flexural modulus or stiffness of the blends increase. The very polar epoxy resins (Epon 1001F and Epon 165) have slightly lower overall flexural moduli. For applications requiring the best room temperature notched Izod impact resistances, using no epoxy resins is clearly preferred. For applications requiring the highest flexural modulus or stiffness, a 2% loading of the lower polarity epoxy resins is preferred.

TABLE 5

Injection Molded - Type of Epon Resin Used

|  | Ex. 18 | Ex. 19 | Ex. 20 | Ex. 21 | Ex. 22 |
|---|---|---|---|---|---|
| Topas 6017 | 59.9 | 58.9 | 57.9 | 58.9 | 57.9 |
| Vistalon 8600 | 20 | 20 | 20 | 20 | 20 |
| EPON 1002 |  | 1 | 2 |  |  |
| EPON 1001F |  |  |  | 1 | 2 |
| Jetfil 700C | 20 | 20 | 20 | 20 | 20 |

TABLE 5-continued

Injection Molded - Type of Epon Resin Used

|  | Ex. 18 | Ex. 19 | Ex. 20 | Ex. 21 | Ex. 22 |
|---|---|---|---|---|---|
| Irgafos 168 | 0.1 | 0.1 | 0.1 | 0.1 | 0.1 |
| Tens @ Yield (MPa) | 40.82 | 46.30 | 42.38 | 40.48 | 41.16 |
| Strain @ Yield (%) | 3.2 | 3 | 3 | 3.3 | 3.1 |
| Strain @ Break (%) | 4.4 | 5.2 | 11.2 | 14 | 8.4 |
| Young's Modulus (MPa) | 2757 | 3378 | 3304 | 2850 | 2955 |
| Flex Mod 1% sec (MPa) @ 0.05 in/min | 2268 | 2717 | 2592 | 2248 | 2399 |
| Flex Mod 1% Tan (MPa) @ 0.05 in/min | 2199 | 2848 | 2868 | 2310 | 2537 |
| HDT @ 0.46 MPa (C.) | 157.5 | 157.3 | 155.8 | 155.9 | 155.5 |
| HDT @ 1.80 MPa (C.) | 124.8 | 134 | 128.9 | 130.3 | 129.8 |
| Notched Izod @ 23 C. (J/m) | 496.4 | 181.5 | 266.9 | 357.6 | 314.9 |
| Notched Izod @ −18 C. (J/m) | 112.1 | 32.0 | 74.7 | 74.7 | 64.1 |

TABLE 6

Injection Molded - Type of Epon Resin Used

|  | Ex. 23 | Ex. 24 | Ex. 25 | Ex. 26 | Ex. 27 | Ex. 28 |
|---|---|---|---|---|---|---|
| Topas 6017 | 58.9 | 57.9 | 58.9 | 57.9 | 58.9 | 57.9 |
| Vistalon 8600 | 20 | 20 | 20 | 20 | 20 | 20 |
| EPON 1007F | 1 | 2 |  |  |  |  |
| EPON 1009F |  |  | 1 | 2 |  |  |
| EPON 165 |  |  |  |  | 1 | 2 |
| Jetfil 700C | 20 | 20 | 20 | 20 | 20 | 20 |
| Irgafos 168 | 0.1 | 0.1 | 0.1 | 0.1 | 0.1 | 0.1 |
| Tens @ Yield (MPa) | 41.26 | 42.49 | 40.84 | 42.08 | 38.90 | 40.13 |
| Strain @ Yield (%) | 3.1 | 2.8 | 3 | 2.8 | 4.6 | 4.1 |
| Strain @ Break (%) | 11 | 5.8 | 13.3 | 6.6 | 22 | 19 |
| Young's Modulus (MPa) | 2946 | 3291 | 3238 | 3213 | 2180 | 2527 |
| Flex Mod 1% sec (MPa) @ 0.05 in/min | 2406 | 2579 | 2427 | 2654 | 1944 | 2117 |
| Flex Mod 1% Tan (MPa) @ 0.05 in/min | 2523 | 2854 | 2386 | 2710 | 1834 | 2013 |
| HDT @ 0.46 MPa (C.) | 156.3 | 156.1 | 156.9 | 156.8 | 154.8 | 153.6 |
| HDT @ 1.80 MPa (C.) | 131.7 | 130.7 | 129.1 | 131.3 | 129.8 | 128.3 |
| Notched Izod @ 23 C. (J/m) | 373.6 | 277.6 | 373.6 | 282.9 | 368.3 | 304.3 |
| Notched Izod @ −18 C. (J/m) | 69.4 | 53.4 | 69.4 | 58.7 | 74.7 | 69.4 |

Examples 29 to 35 and 37 and Comparative Examples 36 and 38

Figure 6:
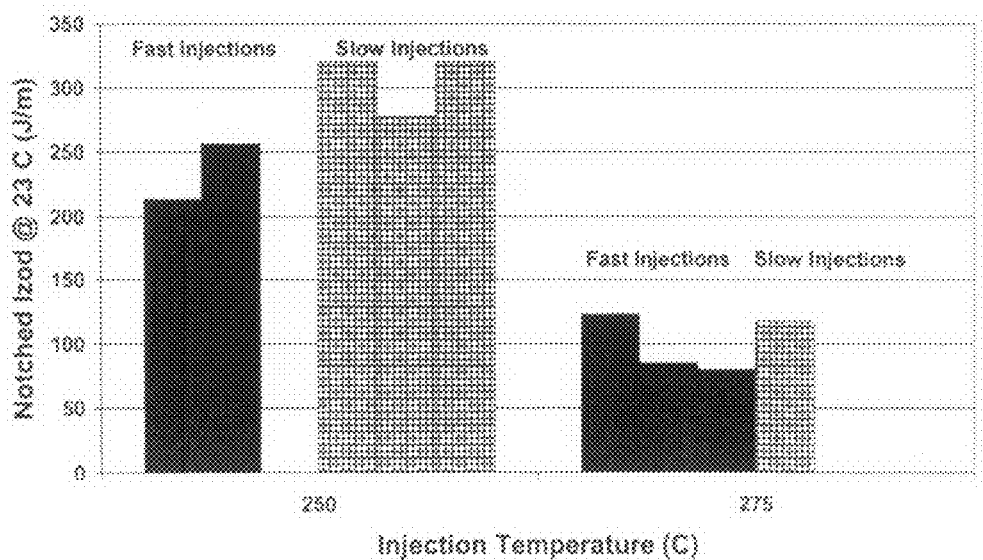
FIG. 6 is a graph showing the effect of injection molding temperature and speed on the room temperature notched Izod impact resistance of the 60:20:20 Topas 6017/Vistalon 8600/Talc blends of Examples 29 to 38.
Figure 7:
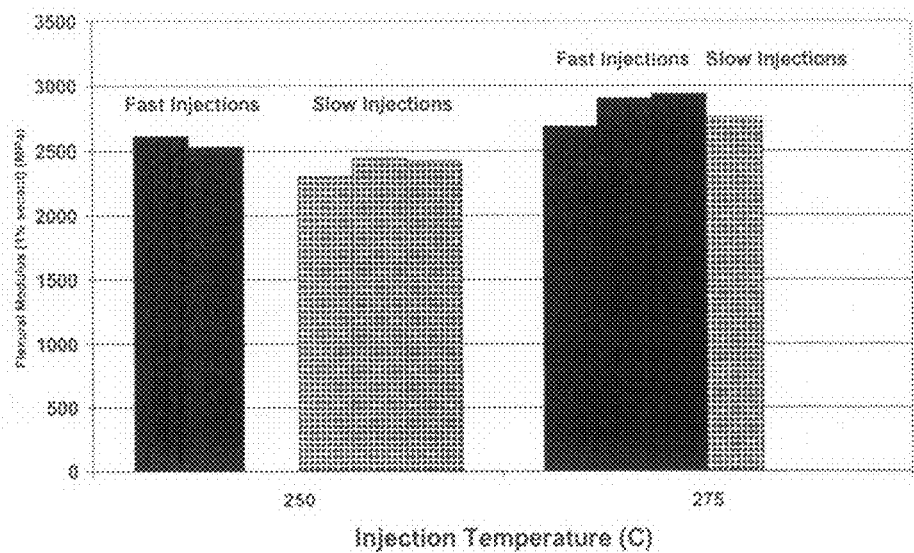
FIG. 7 is a graph showing the effect of injection molding temperature and speed on the flexural modulus (1% secant) of the 60:20:20 Topas 6017/Vistalon 8600/Talc blends of Examples 29 to 38.

The effects of processing conditions are investigated in the Examples of Tables 7 and 8 for a series 60:20:20 Topas 6017/Vistalon 8600/Imi Fabi HTP1C talc blends. The extruder temperatures, screw speeds, injection molding temperatures, and injection speeds were varied. In FIG. 6, it can be seen that the biggest effect in these data is the temperature used for the injection molding. The room temperature notched Izod impact resistance is much higher, if the injection molding machine is run at 250° C. Slow injection speeds also give slightly higher impact resistances. In FIG. 7, it can be seen that the flexural modulus is slightly higher at injection molding temperatures of 275° C. with fast injections. It will also be seen that the effects are much larger for the impact properties than for the stiffness properties.

TABLE 7

Injection Molded - Effect of Processing Conditions

|  | Ex. 29 | Ex. 30 | Ex. 31 | Ex. 32 | Ex. 33 |
|---|---|---|---|---|---|
| Topas 6017 | 57.9 | 57.9 | 57.9 | 57.9 | 57.9 |
| Vistalon 8600 | 20 | 20 | 20 | 20 | 20 |
| Imi Fabi HTP1C | 20 | 20 | 20 | 20 | 20 |
| EPON 1002 | 2 | 2 | 2 | 2 | 2 |
| Irgafos 168 | 0.1 | 0.1 | 0.1 | 0.1 | 0.1 |
| Tens @ Yield (MPa) | 37.98 | 41.39 | 38.19 | 38.11 | 41.13 |
| Strain @ Yield (%) | 2.9 | 2.8 | 2.6 | 2.5 | 3 |
| Strain @ Break (%) | 8.3 | 6.3 | 5 | 5 | 7.2 |
| Young's Modulus (MPa) | 2939 | 3188 | 3173 | 3298 | 3176 |
| Flex Mod 1% sec (MPa) @ 0.05 in/min | 2303 | 2613 | 2689 | 2723 | 2441 |
| Flex Mod 1% Tan (MPa) @ 0.05 in/min | 2441 | 2875 | 2985 | 2772 | 2779 |
| HDT @ 0.46 MPa (C.) | 155.8 | 156 | 155.2 |  |  |
| HDT @ 1.80 MPa (C.) | 130.5 | 131 | 130.1 | 131.7 | 129.9 |
| Notched Izod @ 23 C. (J/m) | 320.3 | 213.5 | 122.8 | 112.1 | 277.6 |
| Notched Izod @ 0 C. (J/m) | 208.2 | 106.8 | 64.1 | 69.4 | 138.8 |
| Notched Izod @ −18 C. (J/m) | 117.4 | 64.1 | 42.7 | 58.7 | 90.7 |

TABLE 7-continued

Injection Molded - Effect of Processing Conditions

|  | Ex. 29 | Ex. 30 | Ex. 31 | Ex. 32 | Ex. 33 |
|---|---|---|---|---|---|
| Notched Izod @ −29 C. (J/m) | 74.7 | 42.7 | 42.7 | 42.7 | 42.7 |
| Instrumented Impact @ 23 C. (J) | 21.01 | 26.71 | 13.83 | 9.76 | 20.61 |
| Instrumented Impact @ −29 C. (J) | 4.61 | 4.75 | 8.41 | 3.80 | 5.56 |
| Extruder Temperature | 230 | 230 | 230 | 230 | 230 |
| Extruder RPMs | 150 | 300 | 150 | 300 | 150 |
| Injection Temperature | 250 | 250 | 275 | 275 | 250 |
| Injection Speed | Slow | Fast | Fast | Slow | Slow |

TABLE 8

Injection Molded - Effect of Processing Conditions

|  | Ex. 34 | Ex. 35 | Comp. Ex. 36 | Ex. 37 | Comp. Ex. 38 |
|---|---|---|---|---|---|
| Topas 6017 | 57.9 | 57.9 | 57.9 | 57.9 | 57.9 |
| Vistalon 8600 | 20 | 20 | 20 | 20 | 20 |
| Imi Fabi HTP1C | 20 | 20 | 20 | 20 | 20 |
| EPON 1002 | 2 | 2 | 2 | 2 | 2 |
| Irgafos 168 | 0.1 | 0.1 | 0.1 | 0.1 | 0.1 |
| Tens @ Yield (MPa) | 38.73 | 40.33 | 40.00 | 37.91 | 40.00 |
| Strain @ Yield (%) | 2.8 | 2.9 | 2.5 | 2.6 | 2.4 |
| Strain @ Break (%) | 8 | 8.4 | 4 | 4.7 | 4 |
| Young's Modulus (MPa) | 3108 | 3166 | 3383 | 3258 | 3473 |
| Flex Mod 1% sec (MPa) @ 0.05 in/min | 2420 | 2530 | 2903 | 2758 | 2937 |
| Flex Mod 1% Tan (MPa) @ 0.05 in/min | 2482 | 2682 | 3199 | 3110 | 3130 |
| HDT @ 1.80 MPa (C.) | 128.7 | 127.9 | 133.2 | 131.7 | 133.2 |
| Notched Izod @ 23 C. (J/m) | 320.3 | 256.2 | 85.4 | 117.4 | 80.1 |
| Notched Izod @ 0 C. (J/m) | 192.2 | 112.1 | 48.0 | 64.1 | 48.0 |
| Notched Izod @ −18 C. (J/m) | 96.1 | 64.1 | 42.7 | 45.4 | 42.7 |
| Notched Izod @ −29 C. (J/m) | 69.4 | 42.7 | 32.0 | 50.2 | 42.7 |
| Instrumented Impact @ 23 C. (J) | 21.15 | 19.25 | 10.71 | 10.03 | 9.63 |
| Instrumented Impact @ −29 C. (J) | 5.42 | 5.02 | 4.34 | 5.56 | 4.88 |
| Extruder Temperature | 260 | 260 | 260 | 260 | 260 |
| Extruder RPMs | 300 | 150 | 300 | 150 | 300 |
| Injection Temperature | 250 | 250 | 275 | 275 | 275 |
| Injection Speed | Slow | Fast | Fast | Slow | Fast |

Examples 39 to 41 and Comparative Example 42

Examples 39 and 40 in Table 9 show that 60:20:20 Topas 6015/Vistalon 8600/talc blends have improved room temperature notched Izod impact resistances (425 and 619 J/m) compared to an unfilled 80:20 Topas 6015/Vistalon 8600 blend (364 J/m) shown as Comparative Example 42 in Table 9. This observation is surprising, since for polypropylene impact properties decrease with addition of fillers. The flexural modulus (1% secant) with HTP1C talc for the blend of Example 39 (2344 MPa) is the same as the unfilled blend (2344 MPa) in Comparative Example 42.

TABLE 9

Comparison of Talc For Topas 6015 Filled Blends

|  | Ex. 39 | Ex. 40 | Ex. 41 | Comp. Ex. 42 |
|---|---|---|---|---|
| Topas 6015 (pph) | 59.8 | 58.9 | 48.9 | 79.9 |
| Vistalon 8600 (pph) | 20.0 | 20.0 | 25.0 | 20.0 |
| TALC-HTP1C | 20.0 |  |  |  |
| Talc - Jetfil 700C |  | 20.0 | 25.0 |  |
| Irgafos168 | 0.1 | 0.1 | 0.1 | 0.1 |
| FS-042 | 0.1 |  |  |  |
| Epon 1002 (Epoxy) |  | 1.0 | 1.0 |  |
| Density (g/ml) | 1.124 |  |  | 1.112 |
| Flex Young's Modulus (MPa) | 2500 |  |  | 2600 |
| Flex Mod (1% tan) (MPa) | 2503 | 1868 | 1393 | 2420 |
| Flex Mod (1% sec) (MPa) | 2344 | 1910 | 1434 | 2344 |
| HDT at 0.45 MPa (C.) | 142.2 | 153 | 147 | 142.9 |
| HDT at 1.80 MPa (C.) | 120.8 | 124 | 112 | 121.3 |
| RTNI (J/m) | 424.7 | 619.2 | 688.6 | 363.5 |
| Type of break | 5NB |  |  | 5NB |
| NI @ −18 C. (J/m) | 83.8 | 352.3 | 683.2 | 137.2 |
| Type of break | 5C |  |  | 5C |
| 60 deg. Gloss | 44 |  |  | 57.9 |
| Inst. Impact @ RT (J) 5 mph, 117# | 28.21 |  |  | 34.26 |
| Type of break | 5D |  |  | 5D |
| Inst. Impact @ −29 C. (J) 5 mph 117# | 10.93 |  |  | 21.67 |
| Type of break | 4B; 1BD |  |  | 5DB, 1B |
| Max Tensile Stress (MPa) | 38.61 | 33.71 | 24.55 | 36.22 |
| Tensile Young's Modulus (MPa) | 3280 | 2365 | 1852 | 3147 |
| Tensile Energy @ Break (J) | 6.91 |  |  | 6.37 |
| Tensile Strain @ Break (%) | 10.7 | 11.8 | 16.7 | 10.4 |
| Tensile Yield Strain (%) | 3.2 | 3.8 | 4.7 | 2.9 |
| Rockwell Hardness | 88.4 |  |  | 86.8 |

TABLE 9-continued

Comparison of Talc For Topas 6015 Filled Blends

|  | Ex. 39 | Ex. 40 | Ex. 41 | Comp. Ex. 42 |
|---|---|---|---|---|
| Shore A Hardness |  |  | 67 | 4.05 |
| Shore D Hardness |  |  | 64 | 78 |

Example 41 in Table 9 summarizes the properties of a 50:25:25 Topas 6015/Vistalon 8600/talc blend. The three blends of Examples 39 to 41 clearly show how high heat distortion temperatures (>140° C. @ 0.46 MPa), high room temperature notched Izod impacts (>400 J/m), and high stiffnesses (>1400 MPa) can be balanced in blends of cyclic olefin polymers with both high modifier and high reinforcement levels. All three blends easily exceed the 100 J/m room temperature notched Izod impact target, whereas the blends of Examples 40 and 41 have RTNI values significantly exceeding 500 J/m.

Comparative Examples 43 to 48 and Examples 49 to 52

Table 10 summarizes the properties of a series of unfilled blends of Topas 6015 with various Septon rubbers as the polymer modifier. All these blends had low notched Izod resistances at 23° C., because the Septon rubbers had poor compatibility with the cyclic olefin polymer. In Table 11 data are presented for some of these blends when filled with 20 wt. % talc. For the Septon 2007 and 2004 blends, addition of the talc improved both the impact and stiffness properties of the blends. For the Septon 2007 blend, the flexural modulus increased from 2330 to 2813 MPa, and the notched Izod at 23° C. increased from 43 to 101 J/m, with the addition of the talc. For Septon 2004, the flexural modulus increased from 1935 up to 2179 MPa and the notched Izod impact increased from 107 to 246 J/m. These improvements are surprising and suggest that the talc is helping to disperse these less compatible modifiers. The Septon HG-252 did not show this effect and both the stiffness and impact properties declined, when the talc was added.

TABLE 10

Injection Molded - Effect of Type of Septon Rubber (Unfilled Blends)

|  | Comp Ex. 43 | Comp. Ex. 44 | Comp. Ex. 45 | Comp. Ex. 46 | Comp. Ex. 47 | Comp. Ex. 48 |
|---|---|---|---|---|---|---|
| Topas 6015 | 89.8 | 79.8 | 89.8 | 79.8 | 89.8 | 79.8 |
| Septon 2007 | 10 | 20 |  |  |  |  |
| Septon 2004 |  |  | 10 | 20 |  |  |
| Septon HG-252 |  |  |  |  | 10 | 20 |
| Irgafos 168 | 0.1 | 0.1 | 0.1 | 0.1 | 0.1 | 0.1 |
| FS-042 | 0.1 | 0.1 | 0.1 | 0.1 | 0.1 | 0.1 |
| Tens @ Yield (MPa) | 62.46 | 51.05 | 61.12 | 44.04 | 61.84 | 44.67 |
| Strain @ Yield (%) | 4 | 3.8 | 4.1 | 4 | 4.1 | 4.7 |
| Strain @ Break (%) | 4.7 | 4.4 | 6.6 | 6 | 6 | 15 |
| Flex Mod 1% sec (MPa) @ 0.05 in/min | 2772 | 2282 | 2689 | 1965 | 2730 | 2075 |
| Flex Mod 1% Tan (MPa) @ 0.05 in/min | 2689 | 2330 | 2654 | 1958 | 2620 | 2199 |
| HDT @ 0.46 MPa (C.) | 144.5 | 143.6 | 144.5 | 141.7 | 144.9 | 141 |
| HDT @ 1.80 MPa (C.) | 127.5 | 124.5 | 127.7 | 122.2 | 127.3 | 121.5 |
| Notched Izod @ 23 C. (J/m) | 32.0 | 42.7 | 48.0 | 106.8 | 26.7 | 149.5 |
| Notched Izod @ −18 C. (J/m) | 26.7 | 32.0 | 26.7 | 32.0 | 21.4 | 42.7 |
| Bicerano Solubility Parameter Difference $J^{.5}/cm^{1.5}$ | −2.62 | −2.62 | −2.62 | −2.62 | −2.62 | −2.62 |

TABLE 11

Injection Molded - Effect of Type of Septon Rubber (Filled Blends)

|  | Ex. 49 | Ex. 50 | Ex. 51 | Ex. 52 |
|---|---|---|---|---|
| Topas 6015 | 59.8 | 59.8 | 59.8 | 58.8 |
| Septon 2007 | 20 |  |  | 10 |
| Septon 2004 |  | 20 |  |  |
| Septon HG-252 |  |  | 20 | 10 |
| Jetfil 700C | 20 | 20 | 20 | 20 |
| EPON 1002 |  |  |  | 1 |
| Irgafos 168 | 0.1 | 0.1 | 0.1 | 0.1 |
| FS-042 | 0.1 | 0.1 | 0.1 | 0.1 |
| Tens @ Yield (MPa) | 43.80 | 36.56 | 39.89 | 39.32 |
| Strain @ Yield (%) | 3.1 | 6.6 | 12.6 | 7.8 |
| Strain @ Break (%) | 15 | 28 | 34 | 36 |
| Flex Mod 1% sec (MPa) @ 0.05 in/min | 2813 | 2179 | 1924 | 2165 |
| Flex Mod 1% Tan (MPa) @ 0.05 in/min | 3123 | 2282 | 2179 | 2413 |
| HDT @ 0.46 MPa (C.) | 143.8 | 145.5 | 141 | 142.5 |
| HDT @ 1.80 MPa (C.) | 125.5 | 127.3 | 116.6 | 121.2 |
| Notched Izod @ 23 C. (J/m) | 101.4 | 245.5 | 128.1 | 122.8 |
| Notched Izod @ −18 C. (J/m) | 26.7 | 48.0 | 48.0 | 42.7 |

Examples 53 to 55 and 58 and Comparative Examples 56 and 57

Figure 8:
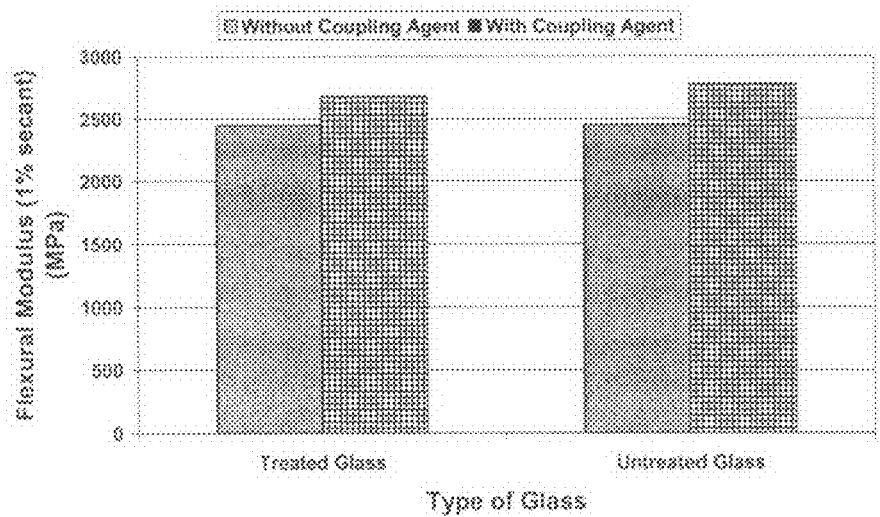
FIG. 8 is a graph showing the effect of glass treatment and coupling agent on the flexural modulus (1% secant) of the 60:20:20 Topas 6015/Vistalon 8600/Glass blends of Examples 53 to 58.
Figure 9:
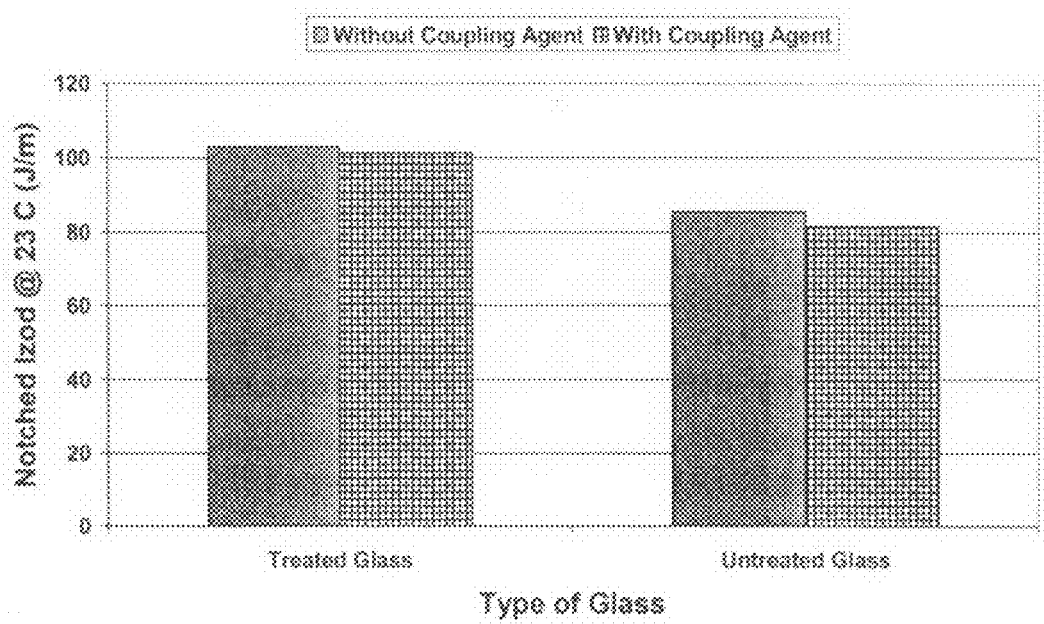
FIG. 9 is a graph showing the effect of glass treatment and coupling agent on the room temperature notched Izod impact resistance of the 60:20:20 Topas 6015/Vistalon 8600/Glass blends of Examples 53 to 58.

Table 12 and FIGS. 8 and 9 summarize the properties of a series of blends of Topas 6015 toughened with Vistalon 8600 and reinforced with glass fibers. In FIG. 8 the effects of glass treatment and the use of a coupling agent are summarized. Coupling agents such as Exxelor PO-1020, maleic anhydride grafted polypropylene, are added to the reinforced blends in Examples 54, 57 and 58 to improve the adhesion between the fillers and the polymer matrix. Similarly, the glass fibers used in Examples 53 to 55 are treated with silanes to improve the adhesion between the glass and the polymer matrix. Better adhesion between reinforcements and the polymer matrix usually leads to improved stiffnesses for the blend. In FIG. 8 it can be seen that the coupling agents slightly increase the flexural modulus of the blends, however, the treatment of the glass has little effect. A similar comparison of the data is presented in FIG. 9 for the room temperature notched Izod impact resistance of the blends. For this property the treated glass leads to higher impact resistance, but there is little effect from the coupling agent. For blends needing the highest flexural modulus and notched Izod impact resistance, it is preferred to use both treated glass fibers and a coupling agent.

Comparative Examples 59 to 61 and Examples 62 and 63

In Table 13 glass filled blends of Topas 6017 are illustrated. Comparative Examples 59 to 61 contain no modifiers and

TABLE 12

Injection Molded - Effect of Glass Fiber Fillers

| | Ex. 53 | Ex. 54 | Ex. 55 | Comp Ex. 56 | Comp. Ex. 57 | Ex. 58 |
|---|---|---|---|---|---|---|
| Topas 6015 | 69.8 | 68.3 | 64.8 | 69.8 | 68.3 | 48.3 |
| Vistalon 8600 | 20 | 20 | 25 | 20 | 20 | 20 |
| OC CS-147-14P (Glass Fibers) (pph) | 10 | 10 | 10 | | | |
| OC CS-144-14A (Glass Fibers) (pph) | | | | 10 | 10 | |
| JetFil 700C | | | | | | 30 |
| Exxelor PO-1020 | | 1.5 | | | 1.5 | 1.5 |
| Irgafos 168 | 0.1 | 0.1 | 0.1 | 0.1 | 0.1 | 0.1 |
| FS-042 | 0.1 | 0.1 | 0.1 | 0.1 | 0.1 | 0.1 |
| MFR @ 300 C. | 6.3 | 8.2 | 4.4 | 6.7 | 7.5 | 2.3 |
| Tens @ Yield (psi) | 41.18 | 41.64 | 34.17 | 40.47 | 41.86 | 33.22 |
| Strain @ Yield (%) | 3.1 | 2.5 | 3.2 | 3 | 2.4 | 3.8 |
| Strain @ Break (%) | 8 | 5 | 12 | 8 | 5 | 18 |
| Tensile Young's Modulus (MPa) | 3071 | 3288 | 2563 | 2857 | 3389 | 3419 |
| Flex Mod 1% sec (MPa) @ 0.05 in/min | 2448 | 2682 | 2027 | 2455 | 2779 | 2261 |
| Flex Mod 1% Tan (MPa) @ 0.05 in/min | 2634 | 2792 | 2075 | 2599 | 2930 | 2468 |
| HDT @ 0.46 MPa (C.) | 142.1 | 145.7 | 138.1 | 141.2 | 145.6 | 140.7 |
| HDT @ 1.80 MPa (C.) | 121.4 | 129.6 | 114.4 | 121.3 | 128.7 | 116.7 |
| Notched Izod @ 23 C. (J/m) | 103.0 | 101.4 | 160.1 | 85.4 | 81.7 | 533.8 |
| Notched Izod @ -18 C. (J/m) | 74.7 | 53.4 | 117.4 | 58.7 | 37.9 | 74.7 |
| Instrumented Impact @ 23 C. (J) | 17.35 | 17.76 | 18.44 | 17.49 | 18.44 | 24.81 |
| Type of Breaks | DB | DB | DB | DB | DB | D |
| Instrumented Impact @ -29 C. (J) | | | | | | 9.76 |
| Type of Breaks | | | | | | BD |
| Specific Gravity (g/mL) | 1.049 | 1.045 | 1.034 | 1.046 | 1.048 | 1.198 |
| Shore D Hardness | 63 | 63 | 61 | 63 | 62 | 59 |
| Rockwell Hardness | 94.3 | 94.9 | 86.3 | 97.1 | 91.9 | 75.8 |

It will be seen from Table 12 that all the blends containing 20 wt. % of Vistalon 8600 meet the target of greater than 100 J/m for room temperature notched Izod impact. Higher levels of impact resistance are possible by using even higher loadings of the modifiers, as in Example 55. However, the increased impact resistance comes with slightly decreased stiffness. For applications needing very high impact resistance, a blend like Example 58 with 30% talc has outstanding impact properties (533 J/m) but still has a flexural modulus only slightly lower than the best glass filled blend (2261 vs. 2682 MPa). Another advantage of these talc filled blends is that they should have better surface smoothness, when injection molded.

have very high flexural modulus but very poor notched Izod impact properties. The glass fibers lead to slightly higher heat distortion temperatures than are seen in blends with modifiers. These blends are too brittle for use in many applications.

Examples 50 and 51 are glass reinforced Topas 6017/Vistalon 8600 blends. In addition, some of the very small Imi Fabi Ultra 5C talc has been added to the blend to improve the dispersion of the Vistalon 8600 modifier. Although the addition of the glass fibers resulted in a decrease in the flexural modulus, the notched Izod impact properties increased dramatically. These blends are not as good in overall properties as several of the blends presented in Tables 1 to 8 that were filled with just talc.

TABLE 13

Injection Molded - Effect of Glass Fiber Fillers

| | Comp. Ex. 59 | Comp. Ex. 60 | Comp. Ex. 61 | Ex. 62 | Ex. 63 |
|---|---|---|---|---|---|
| Topas 6017 | 88.4 | 78.4 | 68.4 | 58.4 | 53.4 |
| Vistalon 8600 | | | | 20 | 25 |
| OC CS-144-14A (Glass Fibers) | 10 | 20 | 30 | 5 | 10 |
| Imi Fabi Ultra 5C | | | | 15 | 10 |
| Exxelor PO-1020 | 1.5 | 1.5 | 1.5 | 1.5 | 1.5 |
| Irgafos 168 | 0.1 | 0.1 | 0.1 | 0.1 | 0.1 |
| Tens @ Yield (MPa) | | | | 40.84 | 33.72 |
| Strain @ Yield (%) | | | | 3 | 3.4 |
| Strain @ Break (%) | 2.7 | 2.1 | 1.5 | 10 | 11 |
| Young's Modulus (MPa) | 4254 | 5561 | 7040 | 3388 | 2976 |
| Flex Mod 1% sec (MPa) @ 0.05 in/min | 3992 | 5068 | 6219 | 2503 | 2199 |
| Flex Mod 1% Tan (MPa) @ 0.05 in/min | 4054 | 5336 | 6674 | 2854 | 2399 |
| HDT @ 0.46 MPa (C.) | 163.6 | 164.4 | >165 | 156.8 | 154.3 |

TABLE 13-continued

Injection Molded - Effect of Glass Fiber Fillers

|  | Comp. Ex. 59 | Comp. Ex. 60 | Comp. Ex. 61 | Ex. 62 | Ex. 63 |
|---|---|---|---|---|---|
| HDT @ 1.80 MPa (C.) | 148.6 | 152.3 | 153.5 | 131.6 | 129.5 |
| Notched Izod @ 23 C. (J/m) | 25.1 | 27.2 | 29.9 | 160.1 | 202.8 |
| Notched Izod @ −18 C. (J/m) | 26.2 | 25.6 | 26.7 | 58.7 | 85.4 |
| Instrumented Impact @ 23 C. (J) | 5.4 | 4.9 | 5.8 | 16.8 | 14.9 |
| Type of Breaks | B | B | B | B | B |

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby.

What is claimed is:

1. A polymer composition comprising a polymer blend of:
   (a) at least 40 wt % (based upon the weight of the polymer composition) of a first polymer component comprising a cyclic olefin polymer comprising ethylene and at least 20 wt % (based upon the weight of the cyclic olefin polymer) of norbornene and/or dicyclopentadiene, said cyclic olefin polymer having a glass transition temperature greater than 100° C.;
   (b) from about 15 wt % to about 40 wt % (based upon the weight of the polymer composition) of a second polymer component comprising an acyclic olefin polymer modifier having a glass transition temperature of less than −30° C. and a Bicerano solubility parameter that is up to 0.6 $J^{0.5}/cm^{1.5}$ less than the Bicerano solubility parameter of the cyclic olefin polymer; and
   (c) at least 10 wt % (based upon the weight of the polymer composition) of one of more fillers having a median particle diameter of about 0.1 to about 100 microns and an aspect ratio greater than 1.2,
   wherein: 1) the notched Izod impact resistance of said polymer composition measured at 23° C. is greater than 100 J/m; 2) the flexural modulus (1% secant method) of said polymer composition is greater than 1400 MPa; and 3) the domain size of the acyclic olefin polymer modifier is less than 2 microns in average diameter.

2. The polymer composition of claim 1, wherein said cyclic olefin polymer comprises at least 30 wt % of said one or more cyclic olefins.

3. The polymer composition of claim 1, wherein said cyclic olefin polymer comprises at least 40 wt % of said one or more cyclic olefins.

4. The polymer composition of claim 1, wherein at least a portion of said cyclic olefin polymer has a glass transition temperature of greater than 120° C.

5. The polymer composition of claim 1, wherein at least a portion of said cyclic olefin polymer has a glass transition temperature of greater than 140° C.

6. The polymer composition of claim 1, wherein at least a portion of said cyclic olefin polymer has a glass transition temperature of greater than 160° C.

7. The polymer composition of claim 1, wherein all of said cyclic olefin polymer has a glass transition temperature of greater than 100° C.

8. The polymer composition of claim 1, wherein said composition comprises from about 20 wt % to about 30 wt % of the polymer modifier.

9. The polymer composition of claim 1, wherein at least a portion of the polymer modifier has a glass transition temperature of less than −40° C.

10. The polymer composition of claim 1, wherein at least a portion of the polymer modifier has a glass transition temperature of less than −50° C.

11. The polymer composition of claim 1, wherein no portion of the polymer modifier has a softening point greater than +30° C.

12. The polymer composition of claim 1, wherein no portion of the polymer modifier has a softening point greater than +10° C.

13. The polymer composition of claim 1, wherein the Bicerano solubility parameter of the polymer modifier is between 0.1 and 0.5 $J^{0.5}/cm^{1.5}$ less than the Bicerano solubility parameter of the cyclic olefin polymer.

14. The polymer composition of claim 1, wherein the Bicerano solubility parameter of the polymer modifier is between 0.2 and 0.4 $J^{0.5}/cm^{1.5}$ less than the Bicerano solubility parameters of the cyclic olefin polymer.

15. The polymer composition of claim 1, wherein said filler comprises 1 to 40% (based on the weight of the polymer composition).

16. The polymer composition of claim 1, wherein said filler comprises 5 to 20% (based on the weight of the polymer composition).

17. The polymer composition of claim 1, wherein the filler is selected from mineral aggregates (natural or synthetic), fibers, carbon black, graphite, wollastonite, natural and synthetic clays including nanoclays and organoclays, sand, glass beads, and mixtures thereof.

18. The polymer composition of claim 1, wherein the filler comprises at least one glass fibers, carbon fibers, polyethylene terephthalate (PET) fibers and rayon fibers.

19. The polymer composition of claim 1, wherein the filler is an inorganic material.

20. The polymer composition of claim 1, wherein the filler is selected from talc, mica, glass fibers and mixtures thereof.

21. The polymer composition of claim 1, wherein the filler has a needle like or plate like shape and an aspect ratio greater than 10.

22. The polymer composition of claim 1, wherein the filler has a median particle diameter of about 0.5 to about 50 microns.

23. The polymer composition of claim 1 and further comprising a coupling agent to improve the adhesion between the filler and the cyclic olefin polymer.

24. The polymer composition of claim 23, wherein the coupling agent comprises at least one of an epoxy resin, a maleic anhydride grafted polypropylene, and a maleic anhydride grafted ethylene polymer.

25. The polymer composition of claim 1 and having a notched Izod impact resistance measured at 23° C. of greater than 150 J/m.

26. The polymer composition of claim 1 and having a notched Izod impact resistance measured at 23° C. of greater than 200 J/m.

27. The polymer composition of claim 1 and having a notched Izod impact resistance measured at 23° C. of greater than 300 J/m.

28. The polymer composition of claim 1 and having a notched Izod impact resistance measured at 23° C. of greater than 500 J/m.

29. The polymer composition of claim 1 and having a flexural modulus (1% secant method) greater than 2000 MPa.

30. The polymer composition of claim 1 and having a flexural modulus (1% secant method) greater than 2500 MPa.

31. The polymer composition of claim 1 and having a flexural modulus (1% secant method) greater than 3000 MPa.

32. The polymer composition of claim 1 and having a notched Izod impact resistance measured at −18° C. of greater than 50 J/m.

33. The polymer composition of claim 1 and having a notched Izod impact resistance measured at −18° C. of greater than 100 J/m.

34. The polymer composition of claim 1 and having a notched Izod impact resistance measured at −18° C. of greater than 150 J/m.

35. The polymer composition of claim 1 and having a notched Izod impact resistance measured at −18° C. of greater than 200 J/m.

36. The polymer composition of claim 1 and having a heat distortion temperature measured using a 0.46 MPa load of greater than 85° C.

37. The polymer composition of claim 1 and having a heat distortion temperature measured using a 0.46 MPa load of greater than 100° C.

38. The polymer composition of claim 1 and having a heat distortion temperature measured using a 0.46 MPa load of greater than 115° C.

39. The polymer composition of claim 1 and having a heat distortion temperature measured using a 0.46 MPa load of greater than 130° C.

40. The polymer composition of claim 1 and having an instrumented impact energy measured at 23° C. of greater than 15 J.

41. The polymer composition of claim 1 and having an instrumented impact energy measured at 23° C. of greater than 25 J.

42. The polymer composition of claim 1, wherein said polymer modifier comprises a polymer of ethylene, a alpha-olefin, and at least 5 wt % but less than 20 wt % of a cyclic olefin.

43. The polymer composition of claim 42, wherein the cyclic olefin is selected from norbornene, ethylidene norbornene, vinylnorbornene, vinylcyclohexene and dicyclopentadiene.

44. The polymer composition of claim 42, wherein the alpha olefin is selected from propylene, hexene and octene.

45. The polymer composition of claim 1, wherein said polymer modifier comprises a polymer comprising ethylene, propylene, and optionally one or more dienes.

46. The polymer composition of claim 45, wherein the polymer comprises from about 25 to about 80 wt % of ethylene, up to 15 wt % of one or more dienes and the balance propylene.

47. The polymer composition of claim 1, wherein said polymer modifier comprises a polymer of ethylene and 7-methyl-1,6-octadiene.

48. The polymer composition of claim 1, wherein said cyclic olefin polymer comprises a copolymer of ethylene with norbornene.

49. The polymer composition of claim 1, wherein some or all of the remaining double bonds of the cyclic olefin polymer are hydrogenated, epoxidized and/or functionalized.

50. The polymer composition of claim 1 and comprising a melt blend of said cyclic olefin polymer (a) and said polymer modifier (b).

51. A component for an automobile fabricated from the polymer composition of claim 1.

* * * * *